(12) United States Patent
Katayama et al.

(10) Patent No.: US 6,912,013 B2
(45) Date of Patent: Jun. 28, 2005

(54) TELEVISION RECEIVER

(75) Inventors: Takahiro Katayama, Osaka (JP); Toshihiro Takagi, Osaka (JP)

(73) Assignee: Funai Electric Co., Ltd., Osaka (JP)

(*) Notice: Subject to any disclaimer, the term of this patent is extended or adjusted under 35 U.S.C. 154(b) by 528 days.

(21) Appl. No.: 10/188,491

(22) Filed: Jul. 2, 2002

(65) Prior Publication Data

US 2003/0007096 A1 Jan. 9, 2003

(30) Foreign Application Priority Data

Jul. 3, 2001 (JP) .................................... P.2001-201836

(51) Int. Cl.[7] .................. H04N 5/445; H04N 5/278
(52) U.S. Cl. ................ 348/564; 348/563; 348/589; 348/468; 348/465
(58) Field of Search .................. 348/564, 563, 348/569, 586, 588, 589, 598–600, 468, 465; H04N 5/445, 5/278

(56) References Cited

U.S. PATENT DOCUMENTS

| | | | | |
|---|---|---|---|---|
| 6,097,442 A | * | 8/2000 | Rumreich et al. | 348/563 |
| 6,208,383 B1 | * | 3/2001 | Park | 348/468 |
| 6,373,526 B1 | * | 4/2002 | Kessler et al. | 348/468 |
| 2002/0075403 A1 | * | 6/2002 | Barone et al. | 348/461 |

FOREIGN PATENT DOCUMENTS

| | | | | |
|---|---|---|---|---|
| JP | 63-178319 | 7/1988 | ............. | G06F/3/14 |
| JP | 7-325696 | 12/1995 | ............. | G06F/3/14 |
| JP | 8-88840 | 4/1996 | ............. | H04N/7/025 |
| JP | 2655305 | 5/1997 | ............. | H04N/7/025 |
| JP | 2666731 | 6/1997 | ............. | G06F/3/14 |
| JP | 10-187126 | 7/1998 | ............. | G09F/5/14 |
| JP | 11-196386 | 7/1999 | ............. | H04N/7/025 |

OTHER PUBLICATIONS

Patent Abstracts of Japan, Publication No. 06–217268, Publication date Aug. 5, 1994, 2 pages.
Patent Abstracts of Japan, Publication No. 11–196386, Publication date Jul. 21, 1999, 2 pages.
Patent Abtracts of Japan, Publication No. 08–088840, Publication date Apr. 2, 1996, 2 pages.
Patent Abstracts of Japan, Publication No. 63–178319, Publication date Jul. 22, 1988, 2 pages.
Patent Abstracts of Japan, Publication No. 07–325696, Publication date Dec. 12, 1995, 2 pages.
Patent Abstracts of Japan, Publication No. 08/050542, Publication date Feb. 20, 1996, 2 pages.
Patent Abstracts of Japan, Publication No. 10–187126, Publication date Jul. 14, 1998, 2 pages.

* cited by examiner

*Primary Examiner*—Sherrie Hsia
(74) *Attorney, Agent, or Firm*—Osha Liang LLP

(57) ABSTRACT

A television receiver 1 enables a decoder 5 to extract a closed caption signal of DTVCC method from a digital broadcasting signal received via an antenna 11. The closed caption signal of DTVCC method extracted here is analyzed and converted into the closed caption signal of Line 21 method. And in a DVE 6, the closed caption data of Line 21 method is inserted into the 21st scanning line of an analog picture signal converted by the decoder 5 for output.

13 Claims, 21 Drawing Sheets

US 6,912,013 B2

TELEVISION RECEIVER

BACKGROUND OF THE INVENTION

1. Field of the Invention

The present invention relates to a television receiver for receiving the digital broadcasting, and more particularly to a television receiver for receiving the caption broadcasting with the caption data.

2. Description of the Related Art

The conventional television broadcasting was the analog broadcasting of the NTSC (National Television System Committee) system. In the analog broadcasting, the caption broadcasting was made in which a broadcasting station distributes a picture signal and the caption data (closed caption data (CC)). In the analog broadcasting, the closed caption data is distributed in the twenty first scanning line of the picture signal, as standardized in the EIA (Electronic Industries Association)-608. This method of distributing the closed caption data in the twenty first scanning line of the picture signal is hereinafter referred to as a Line 21 method.

This Line 21 method has spread especially in the United States. In the United States, it is obligatory that any television of 13 inches or greater contains a function of decoding the closed caption data distributed by the Line 21 method. Therefore, the televisions having the function of decoding the closed caption data of the Line 21 method have widely spread.

Recently, the digital television broadcasting (hereinafter simply referred to as the digital broadcasting) has been started. For example, the digital broadcasting of the ATSC (Advanced Television Standards Committee) system has been started. In the digital broadcasting, the caption broadcasting for distributing the closed caption data is also practiced. The digital broadcasting employs the MPEG2 for distributing the picture data. The digital broadcasting has an area of Picture User Data Extension (hereinafter referred to as a User Data area) in part of the picture data, and distributes the closed caption data, using this User Data area, as standardized in the EIA (Electronic Industrial Association)-708B. This method of distributing the closed caption data in the digital broadcasting is hereinafter referred to as a DTVCC method.

With the start of the digital broadcasting, a television receiver (hereinafter simply referred to as a receiver) or a so-called Set Top Box has been offered in which a digital broadcasting signal received via an antenna is converted into a conventional analog broadcasting signal and output to the television for analog broadcasting. The user employs this receiver to receive the digital broadcasting with the television for analog broadcasting as conventionally used.

However, there were none of the receivers for digital broadcasting as offered heretofore that output the closed caption data distributed by the DTVCC method along with the picture signal in accordance with the Line 21 method. Therefore, for a caption program of the digital broadcasting (employing the DTVCC method), the subtitles could not be displayed on the screen of the conventional television for analog broadcasting, employing the receiver.

Further, there has been offered an apparatus having a function of outputting the closed caption data recorded on the recording medium such as a video cassette record (VCR) or a digital versatile disk (DVD), along with the picture signal, in accordance with the Line 21 method. For instance, refer to JP-B-2655305, JP-A-11-196386, and JP-A-8-88840.

However, no apparatus has been offered in which the digital broadcasting signal is received in the above manner, and the closed caption data distributed by the DTVCC method is converted into the closed caption data of the Line 21 method to be output.

The Line 21 method or the DTVCC method allows a plurality of windows for displaying the subtitles to be displayed on the screen. The display control techniques for a multi-window in which a plurality of windows are displayed on the screen have been described in JP-A-63-178319, JP-A-7-325696, JP-B-2666731 and JP-A-10-187126.

However, these techniques are not concerned with the receiver for receiving the digital or analog broadcasting, but with the information processing apparatus such as the personal computer.

SUMMARY OF THE INVENTION

It is an object of the present invention to provide a television receiver for displaying the characters based on the caption data distributed by a digital broadcasting signal on the screen of the television for analog broadcasting by converting the caption data distributed by the digital broadcasting signal into the caption data of the analog broadcasting system, and outputting it with an analog picture signal.

Also, it is another object of the invention to provide a television receiver capable of displaying the characters on the screen in an easy-to-see display format.

To achieve the above object, according to the invention, there is provided a television receiver of the present invention comprising: a receiver for receiving a digital broadcasting signal, an extractor for extracting the picture data and the caption data from the digital broadcasting signal received by the receiver, a picture signal converter for converting the picture data extracted by the extracting means into an analog picture signal, a caption data converter for converting the caption data extracted by the extractor into the caption data of the analog broadcasting system, a caption data inserting unit for inserting the caption data of the analog broadcasting system converted by the caption data converter into the analog picture signal converted by the picture signal converter, and an analog picture signal output unit for outputting an analog picture signal having the caption data of the analog broadcasting system inserted by the caption data inserting unit, wherein the caption data converting unit converts the caption data into the hop-on style in which characters decoded from the input caption data by the display unit are stored successively in a non-display memory, and when a predetermined code is obtained by decoding the input caption data, the non-display memory is switched into a display memory, and conversely the display memory is switched into the non-display memory.

With the above constitution, the picture data and the caption data are extracted from the digital broadcasting signal received by the receiver, for example, the digital broadcasting signal of ATSC method by the extractor. Here, the extracted picture data is converted into the analog picture data, for example, the analog picture signal of NTSC method, by the picture signal converter.

On one hand, the extracted caption data is converted into the caption data of analog broadcasting system by the caption data converting means. For example, it is converted into the caption data of the method (hereinafter referred to as the Line 21 method) as standardized in the EIA-608. Furthermore, the caption data converted into the analog broadcasting system by the closed caption data inserting means is inserted into the analog picture signal. The analog picture signal output means outputs the analog picture signal having the caption data of analog broadcasting system inserted.

Accordingly, the display unit (television) having the function of decoding the caption data of analog system is connected with the analog picture signal output means, whereby the characters (subtitles) based on the caption data distributed by the digital broadcasting signal can be displayed on the screen of the display unit.

Since the subtitles are displayed in the hop-on style in which the characters displayed on the screen of the display unit are switched at a time, the characters are not separately displayed one by one on the screen. Accordingly, it is possible to realize the easy-to-see display of characters on the screen, with which the user can be satisfied.

(2) The television receiver comprises storage contents holding means for holding the storage contents of a display memory and a non-display memory for the display unit.

With this constitution, since the storage contents of the display memory and the non-display memory in the display unit are held, the caption data of analog broadcasting system may be created based on differences between the contents (character string) displayed on the screen of the display unit and the contents (character string) stored in the non-display memory of the display unit.

If the contents stored in the display memory and the non-display memory of the display unit are unknown, the memory is firstly reset (cleared), and the contents (character string) displayed on the screen are written into it. On the other hand, if the contents stored in the display memory and the non-display memory are known, the memory is not reset (cleared), and the differences between the contents (character string) displayed on the screen and the contents stored in the non-display memory (i.e., contents (character string) not stored in the non-display memory) are necessary to be written.

Thereby, the data amount of caption data of analog broadcasting system to be inserted into the analog picture signal is suppressed, resulting in smaller load on the unit itself. Also, the faster processing can be effected.

(3) The television receiver comprises code inserting means for measuring the time elapsed since the previous time of inserting the caption data of the analog broadcasting system into the analog picture signal by the caption data inserting means, and inserting a predetermined code into the analog picture signal when the time elapsed reaches a preset time.

Some of the televisions that can handle the caption broadcasting of analog broadcasting system clear the display memory and the non-display memory of the display unit itself, when the caption data is not transmitted continuously beyond a certain time.

On one hand, if the display memory and the non-display memory are cleared, the display unit may not hold the contents of the display memory and the non-display memory correctly.

With the above constitution, before the display unit clears the display memory of the unit itself, the code inserting means inserts a predetermined code into the analog picture signal, whereupon the caption data is transmitted to the display unit.

Thereby, it is possible to prevent the display unit from clearing the display memory and the non-display memory, whereby the contents of the display memory and the non-display memory can be held correctly.

The predetermined code as above desirably has no effect on the display on the screen of the display unit.

(4) The television receiver comprises adjusting means for adjusting the waiting time up to inserting the caption data of the analog broadcasting system into the analog picture signal at the next time in accordance with the number of characters of the caption data of the analog broadcasting system inserted into the analog picture signal by the caption data inserting means.

With the above constitution, the update time of characters (subtitles) displayed on the display unit is adjusted in accordance with the number of characters displayed at this time.

Accordingly, new characters are not displayed on the screen of the display unit before the user finishes reading the characters (subtitles) displayed on the screen of the display unit, and read characters are not kept displayed on the display screen for any length of time.

(5) A television receiver comprising receiving means for receiving a digital broadcasting signal, extracting means for extracting the picture data and the caption data from the digital broadcasting signal received by the receiving means, picture signal converting means for converting the picture data extracted by the extracting means into an analog picture signal, caption data converting means for converting the caption data extracted by the extracting means into the caption data of the analog broadcasting system, caption data inserting means for inserting the caption data of the analog broadcasting system converted by the caption data converting means into the analog picture signal converted by the picture signal converting means, analog picture signal output means for outputting an analog picture signal having the caption data of the analog broadcasting system inserted by the caption data inserting means, and determination means for determining whether or not there is provided a single display window of characters based on the caption data of the analog broadcasting system, wherein the caption data converting means decides the style of the caption data of analog broadcasting system to be converted in accordance with the determined result of the determination means.

With the above constitution, the style of the closed caption data of analog broadcasting system converted by the closed caption data converting means is decided in accordance with the number of display windows for displaying the characters.

Thereby, the subtitles can be displayed in accordance with the number of windows on the screen of the display unit. For instance, when a plurality of windows are provided, the hop-on style is selected, or when a single window is provided, the roll-up style is selected.

Particularly the roll-up style allows the characters to be displayed on the screen, while being scrolled up, and is suitable when the characters are displayed consecutively over plural lines.

However, when there are provided a plurality of windows, each of the windows can not be scrolled in the roll-up style. Therefore, the roll-up style is unsuitable when there are provided a plurality of windows.

The hop-on style may be substituted for the roll-up style. Accordingly, the hop-on style is selected when there are provided a plurality of windows, and the roll-up style is selected when there is provided a single window.

(6) A television receiver comprising receiving means for receiving a digital broadcasting signal, extracting means for extracting the picture data and the caption data from the digital broadcasting signal received by the receiving means, picture signal converting means for converting the picture data extracted by the extracting means into an analog picture signal, caption data converting means for converting the caption data extracted by the extracting means into the caption data of the analog broadcasting system, caption data inserting means for inserting the caption data of the analog broadcasting system converted by the caption data converting means into the analog picture signal converted by the picture signal converting means, analog picture signal output means for outputting an analog picture signal having the caption data of the analog broadcasting system inserted by the caption data inserting means, and screen layout creating means for creating a screen layout for a window of display attribute for displaying the characters, based on the caption data extracted from the digital signal.

With the above constitution, the screen layout is created based on the caption data distributed by the digital broadcasting. Using this screen layout, the display position of character on the screen can be simply determined, when the caption data extracted from the digital broadcasting signal is converted into the caption data of analog broadcasting system. Thereby, the time taken to convert the caption data extracted from the digital broadcasting signal into the caption data of analog broadcasting system can be shortened, thereby suppressing a temporal deviation between the picture and the characters displayed on the screen.

(7) The screen layout creating means creates the screen layout for the windows of non-display attribute in which there are characters to be displayed but those characters are displayed under constraints.

DETAILED DESCRIPTION OF THE PREFERRED EMBODIMENTS

Now, a description will be given in more detail of preferred embodiments of the invention with reference to the accompanying drawings.

A television receiver (hereinafter simply referred to as a receiver) according to an embodiment of the present invention will be described below.

Figure 1:
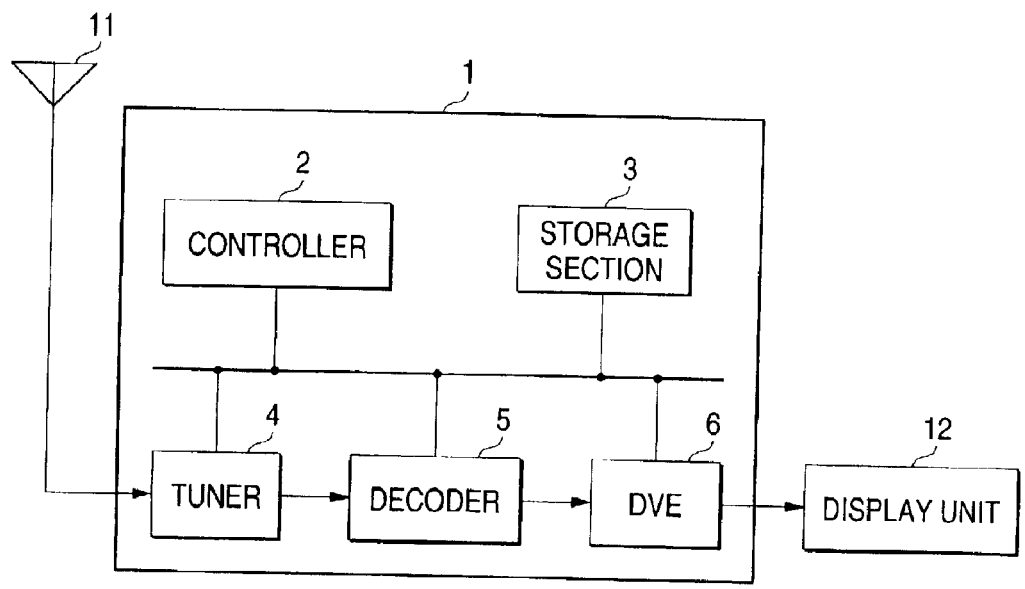
FIG. 1 is a block diagram showing the configuration of a television receiver according to an embodiment of the present invention.

FIG. 1 is a block diagram showing the configuration of the receiver according to the embodiment of the invention. The receiver 1 comprises a controller 2 for controlling the operation of a main unit, a storage section 3 for storing the data produced in operation, a tuner 4 for taking out a signal of selected channel from a digital broadcasting signal received via an antenna 11, a decoder 5 for extracting a picture signal and the closed caption data from the signal taken out by the tuner 4, and a digital picture encoder (hereinafter referred to as a DVE) 6 for outputting an analog broadcasting signal.

The DVE 6 is connected with a display unit 12. This display unit 12 is operated in accordance with the Line 21 method. More specifically, it has a function of extracting the closed caption data inserted into the 21st scanning line of the analog picture signal and distributed, and displaying the characters (subtitles) on the screen, based on the decoded results.

Figure 2:
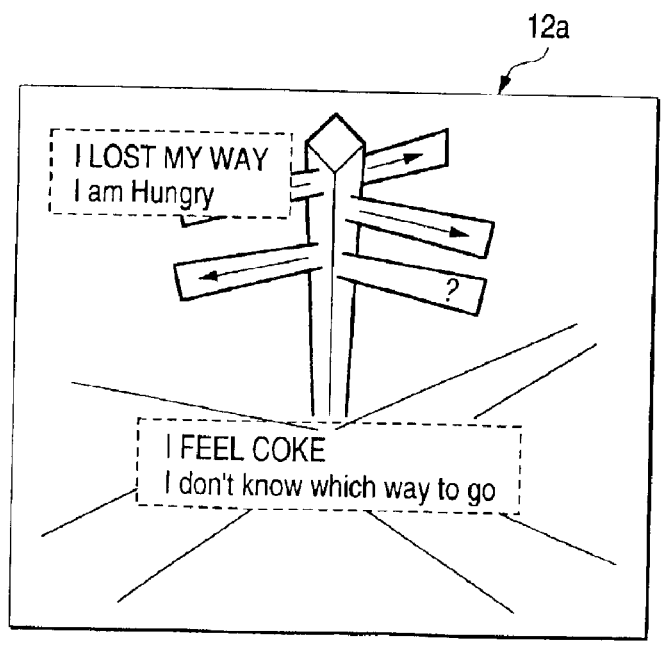
FIG. 2 is a view for explaining a display format of subtitle in a television that can handle the Line 21 method.

Here, the Line 21 method will be briefly described below. The Line 21 method enables the subtitles of a maximum of four lines to be displayed on the screen 12a of the display unit 12, as well known. The subtitles may be displayed on consecutive lines or non-consecutive lines. For instance, two lines can be displayed in each of two regions (surrounded by the broken line in FIG. 2) on the screen 12a as shown in FIG. 2.

There are three kinds of subtitle display styles on the screen 12a, including a paint-on style, a hop-on style, and a roll-up style. The subtitle display style on the screen 12a can be decided by the closed caption data input into the display unit 12 itself.

Figure 3A:
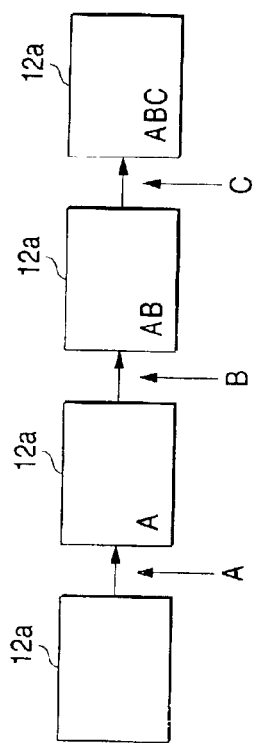
FIGS. 3A to 3C are diagrams for explaining a display format of subtitles in the television that can handle the Line 21 method.

The pen-on style involves displaying successively the characters obtained by decoding the input closed caption data of the Line 21 method on the screen 12, as shown in FIG. 3A. In this pen-on style, characters are displayed one character after another on the screen 12a. FIG. 3A shows an example in which the display unit 12 gets three characters of A, B and C in this order.

Figure 3B:
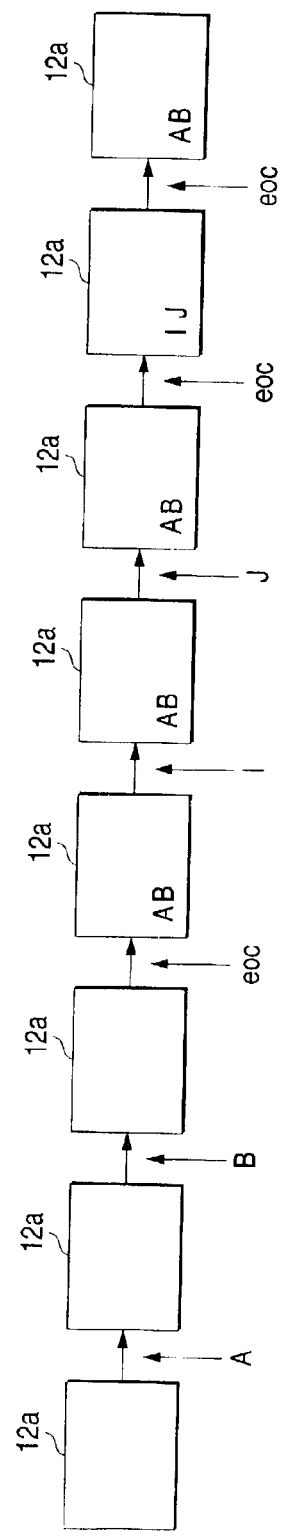

The hop-on style involves preparing a display memory and a non-display memory in the display unit 12 itself, and switching the display of subtitles on the screen 12a every time. More specifically, the characters stored in the display memory are displayed on the screen 12a. The characters obtained by decoding the input closed caption data of the Line 21 method are stored successively in the non-display memory. If a predetermined code (end of caption code (hereinafter referred to as eoc)) is obtained in decoding the input closed caption data of the Line 21 method, the display memory is switched into the non-display memory, and the non-display memory is switched into the display memory. By this switching, the memory acting before as the non-display memory can function as the display memory, and conversely the memory acting before as the display memory can function as the non-display memory. The screen 12a is changed at once with the storage contents of the memory acting before as the non-display memory. That is, a plurality of characters appear on the screen 12a at once. FIG. 3B shows a display example of the screen 12a in which the display unit 12 gets A, B, eoc, I, J, eoc and eoc in this order from the closed caption data of the Line 21 method.

Figure 3C:
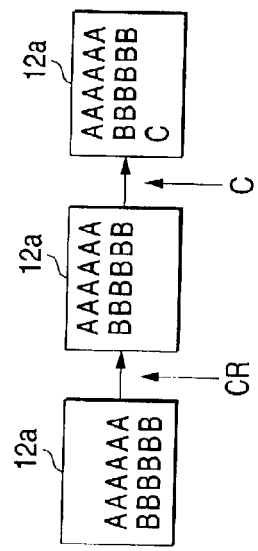

The roll-up style involves displaying the characters obtained by decoding the input closed caption data of the Line 21 method one character after another on the screen 12a, like the paint-on style. If CR (Carriage Return) is obtained, as shown in FIG. 3C, the display of characters is scrolled upward. This roll-up style allows the displayed characters to be easily seen, when the characters are displayed over plural lines.

The operation of the receiver 1 according to this embodiment of the invention will be described below.

A digital broadcasting signal received via the antenna 11 is input into the receiver 1. The tuner 4 takes out a signal of selected channel (bit stream) from the digital broadcasting signal input into the main unit, and inputs the signal into the decoder 5. The decoder 5 extracts the closed caption data of the DTVCC method and the picture data from the digital signal (bit stream) input from the tuner 4.

The digital broadcasting employs the MPEG2. In the digital broadcasting, an area called Picture User Extension (hereinafter referred to as a User Data area) is provided in part of the picture data, and the closed caption data is distributed, employing this User Data area. The decoder 5 extracts the picture data from the digital broadcasting signal received and extracts the closed caption data of the DTVCC method from the User Data area of the extracted picture data.

The decoder 5 converts the extracted picture data into an analog picture signal of the NTSC method. This analog picture signal is output from the DVE 6.

Accordingly, the picture based on the digital broadcasting signal received by the receiver 1 is displayed on the display unit 12 connected to the DVE 6.

On one hand, the closed caption data of the DTVCC method extracted by the decoder 5 is analyzed in the controller 2. The controller 2 converts the closed caption data of the DTVCC method into the hop-on style closed caption data of the Line 21 method.

In the DTVCC method, it is possible to set up a maximum of eight windows for displaying the characters on the screen 12a, and to distribute the closed caption data to these windows. On one hand, in the Line 21 method, it is possible to display a maximum of four lines on the screen 12a. Accordingly, the receiver 1 transforms the closed caption data of four lines into the closed caption data of the Line 21 method, if the closed caption data of the DTVCC method distributed with the digital broadcasting signal indicates the display of characters beyond four lines.

Further, the controller 2 controls the DVE 6 to insert the hop-on style closed caption data of the Line 21 method into the analog picture signal of the NTSC method converted by the decoder 5. The hop-on style closed caption data of the Line 21 method is inserted into the 21st scanning line of the analog picture signal of the NTSC method.

Thereby, the hop-on style closed caption data of the Line 21 method is input into the display unit 12 connected to the DVE 6. The display unit 12 has a function of decoding the closed caption data of the Line 21 method. The display unit 12 decodes the input closed caption data of the Line 21 method and displays it on the screen 12a.

Accordingly, the subtitles based on the closed caption data distributed by the DTVCC method can be displayed in hop-on style on the screen 12a of the display unit 12. Thereby, one can watch and listen to the caption broadcasting of the DTVCC method on the display unit 12 that can handle the analog broadcasting.

Figure 4A:
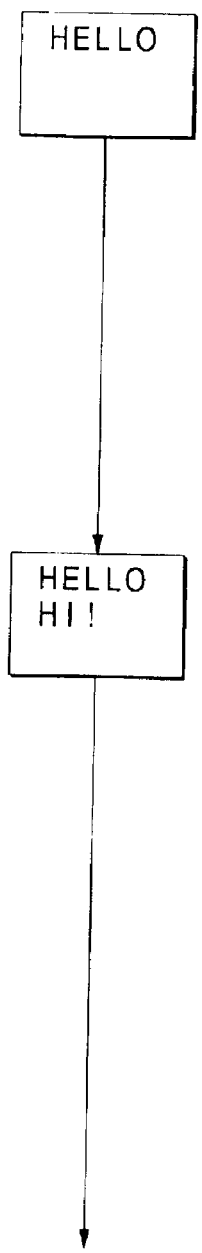
FIGS. 4A and 4B are diagrams for explaining the operation of the receiver according to the embodiment of the invention.
Figure 5A:
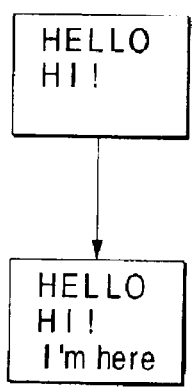
FIGS. 5A and 5B are diagrams for explaining the operation of the receiver according to the embodiment of the invention.
Figure 6A:
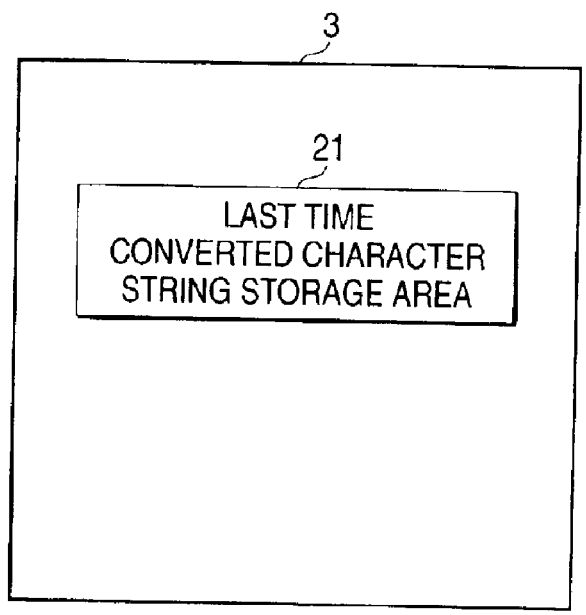
FIGS. 6A and 6B are diagrams for explaining the functional configuration of a storage section of the receiver according to the embodiment of the invention.

Herein, the operation of the receiver 1 will be specifically described below, using an example in which the closed caption data for displaying the subtitles of three lines as shown in FIGS. 4A and 5A is distributed by the DTVCC method. The storage section 3 of the receiver 1 has a previously converted character string storage area 21 for storing the character string converted into the closed caption data of the Line 21 method (see FIG. 6A).

"HELLO" in the first line, "Hi!" in the second line and "I'm here" in the third line are not distributed collectively, but "HELLO" in the first line is distributed, "Hi!" in the second line is distributed after a little while, and "I'm here" in the third line is distributed after a little while.

Figure 4B:
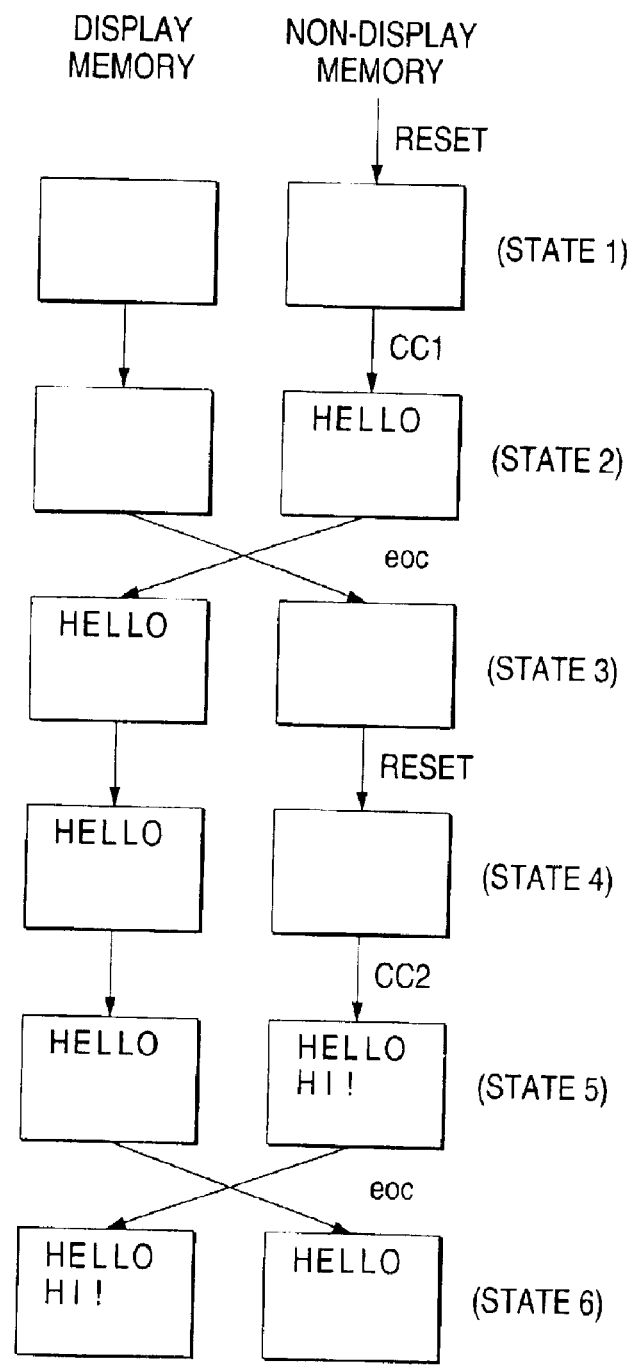
Figure 5B:
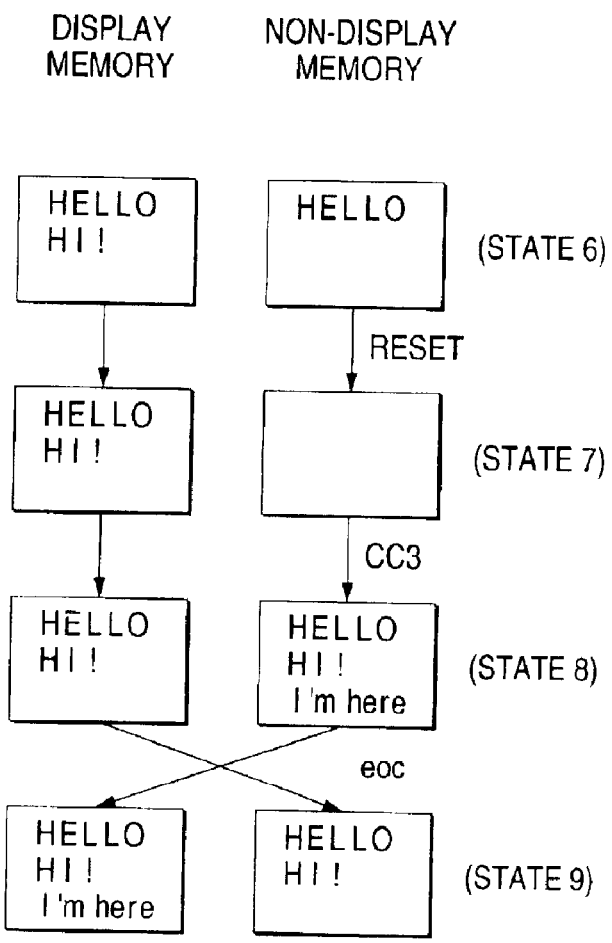

FIGS. 4B and 5B are views showing the storage contents of the display memory and the non-display memory that are prepared for the display unit 12. The display unit 12 displays the storage contents of the display memory on the screen 12a (hop-on style)

The controller 2 firstly analyzes the closed caption data ("HELLO" in the first line) distributed by the DTVCC method, and converts it into the closed caption data (hereinafter referred to as CC1) of the Line 21 method. And in the DVE 6, the closed caption data having the reset code (code enabling the display unit 12 to clear the non-display memory) appended at the top of this CC1, and eoc (code enabling the display unit 12 to switch the non-display memory into the display memory, and switch the display memory into the non-display memory) appended at the end is inserted into the analog picture signal. This analog picture signal is output from the DVE 6.

The controller 2 stores "HELLO" converted into the closed caption data of the Line 21 method in the previously converted character string storage area 21 of the storage section 3. At this time, the controller 2 clears the previously converted character string storage area 21, and then stores "HELLO" converted into the closed caption data of the Line 21 method at present in the previously converted character string storage area 21.

The display unit 12 decodes the closed caption data extracted from the input analog picture signal. The display unit 12 gets the reset code, character string of "HELLO" and eoc in this order from the closed caption data.

For the character string, the display position on the screen 12a is also designated.

The display unit 12 resets the non-display memory based on the reset code firstly obtained (state 1 as shown in FIG. 4B). Thereafter, "HELLO" is stored in the non-display memory (state 2 as shown in FIG. 4B), and if eoc is obtained, the non-display memory is switched into the display memory, and the display memory is switched into the non-display memory (state 3 as shown in FIG. 4B).

In the state 3, a character string "HELLO" is displayed on the screen 12a of the display unit 12 at a time.

The controller 2 analyzes the closed caption data ("Hi!" in the second line) distributed by the DTVCC method after a while.

It is assumed that the closed caption data contains no code indicating the deletion of already displayed characters, namely, "HELLO" in the first line.

The controller 2 converts the closed caption data of the Line 21 method into previous closed caption data, because there is no code indicating the deletion of already displayed characters, and converts "HELLO" stored in the previously converted character string storage area 21 and "Hi!" in the second line distributed at present into the closed caption data of the Line 21 method (hereinafter referred to as CC2).

Then, the controller 2 inserts the closed caption data having the reset code appended at the top of the CC2 and eoc appended at the end into the analog picture signal in the DVE 6. This analog picture signal is output from the DVE 6. Also, controller 2 stores "HELLO" and "Hi!" converted into the closed caption data of the Line 21 method in the previously converted character string storage area 21 of the storage section 3. At this time, the controller 2 clears the previously converted character string storage area 21, and then stores "HELLO" and "Hi!" converted into the closed caption data of the Line 21 method at present in the previously converted character string storage area 21.

The display unit 12 decodes the closed caption data extracted from the input analog picture signal. The display unit 12 gets the reset code, character string of "HELLO" in the first line, character string of "Hi!" in the second line and eoc in this order from the closed caption data. The display unit 12 resets the non-display memory based on the reset code firstly obtained (state 4 as shown in FIG. 4B). Thereafter, "HELLO" and "Hi!" are stored in the non-display memory (state 5 as shown in FIG. 4B), and if eoc is obtained, the non-display memory is switched into the display memory, and the display memory is switched into the non-display memory (state 6 as shown in FIGS. 4B and 5B).

In the state 6, the character strings "HELLO" and "Hi!" are displayed on the screen 12a of the display unit 12 at a time.

To the user, it seems that the string "Hi!" is additionally displayed to the string "HELLO" displayed.

Moreover, the controller 2 analyzes the closed caption data ("I'm here" in the third line) distributed by the DTVCC method after a while.

It is assumed that this closed caption data also contains no code indicating the deletion of already displayed characters, namely, "HELLO" in the first line and "Hi!" in the second line.

The controller 2 converts "HELLO" in the first line and "Hi!" in the second line which are previously converted into the closed caption data of the Line 21 method and stored in the previously converted character string storage area 21, and "I'm here" in the third line that is distributed at present, into the closed caption data of the Line 21 method (hereinafter referred to as CC3), because there is no code indicating the deletion of already displayed characters.

Then, the controller 2 inserts the closed caption data having the reset code appended at the top of the CC3 and eoc appended at the end into the analog picture signal in the DVE 6. This analog picture signal is output from the DVE 6. Also, controller 2 stores "HELLO", "Hi!" and "I'm here" converted into the closed caption data of the Line 21 method in the previously converted character string storage area 21 of the storage section 3. At this time, the controller 2 clears the previously converted character string storage area 21, and then stores "HELLO", "Hi!" and "I'm here" converted into the closed caption data of the Line 21 method at present in the previously converted character string storage area 21.

The display unit 12 decodes the closed caption data extracted from the input analog picture signal. The display unit 12 gets the reset code, character string of "HELLO" in the first line, character string of "Hi!" in the second line, "I'm here" in the third line and eoc in this order from the closed caption data. The display unit 12 resets the non-display memory based on the reset code firstly obtained (state 7 as shown in FIG. 5B). Thereafter, "HELLO", "Hi!" and "I'm here" are stored in the non-display memory (state 8 as shown in FIG. 5B), and if eoc is obtained, the non-display memory is switched into the display memory, and the display memory is switched into the non-display memory (state 9 as shown in FIG. 5B).

In the state 9, the character strings "HELLO", "Hi!" and "I'm here" are displayed on the screen 12a of the display unit 12 at a time.

To the user, it seems that the string "I'm here" is additionally displayed to the strings "HELLO" and "Hi!" displayed.

In this manner, the receiver 1 of this embodiment takes the hop-on style as the display style of subtitles on the display unit 12, in which a plurality of characters can be displayed on the screen 12a at a time to be easily seen by the user. In particular, the characters to be displayed at a time are provided in units of sentence, and further easily seen by the user.

Figure 6B:
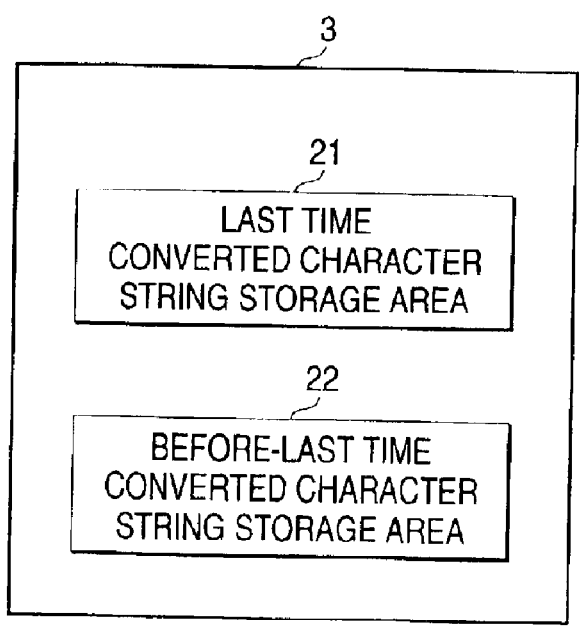

Another embodiment of this invention will be described below. The receiver 1 of this embodiment is different from the receiver 1 of the above embodiment in that the before-last time converted character string storage area 22 is provided in the storage section 3, in addition to the last time converted character string storage area 21 (see FIG. 6B).

The receiver 1 of this embodiment, when the character string converted into the closed caption data of the Line 21 method at present is stored in the last time converted character string storage area 21 as described in the above embodiment, 1. Additionally stores the character string converted at present in the before-last time converted character string storage area 21.
2. Switches the last time converted character string storage area 21 into the before-last time character string storage area 22, and switches the before-last time converted character string storage area 22 into the last time character string storage area 21.

Accordingly, the contents stored in the before-last time storage area 22 are contents stored in the non-display memory prepared for the display unit 12. Also, the contents stored in the last time converted character string storage area 21 are contents stored in the non-display memory prepared for the display unit 12.

The operation of the receiver 1 in this embodiment will be described below.

The receiver 1 of this embodiment is provided with the before-last time converted character string storage area 22, whereby there is no need that all the characters displayed on the screen 12a of the display unit 12 are converted into the closed caption data of the Line 21 method and inserted into the analog picture signal. More specifically, differences between all the characters displayed on the screen 12a of the display unit 12 and the characters stored in the before-last time converted character string storage area 22 (characters stored in the non-display memory of the display unit 12) may be converted into the closed caption data of the Line 21 method and inserted into the analog picture signal for output. In this case, the characters stored in the non-display memory are also displayed, whereby the reset code as cited in the above embodiment is unnecessary (the non-display memory is not cleared.)

Figure 7A:
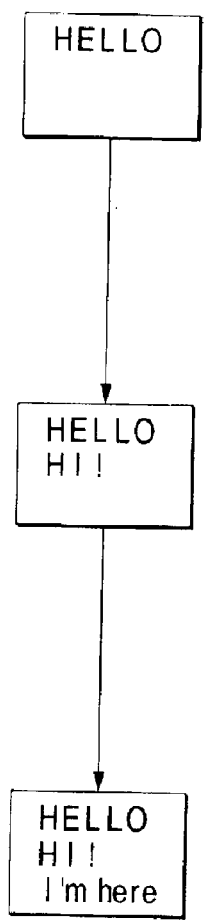
FIGS. 7A and 7B are diagrams for explaining the operation of the receiver according to the embodiment of the invention.
Figure 7B:
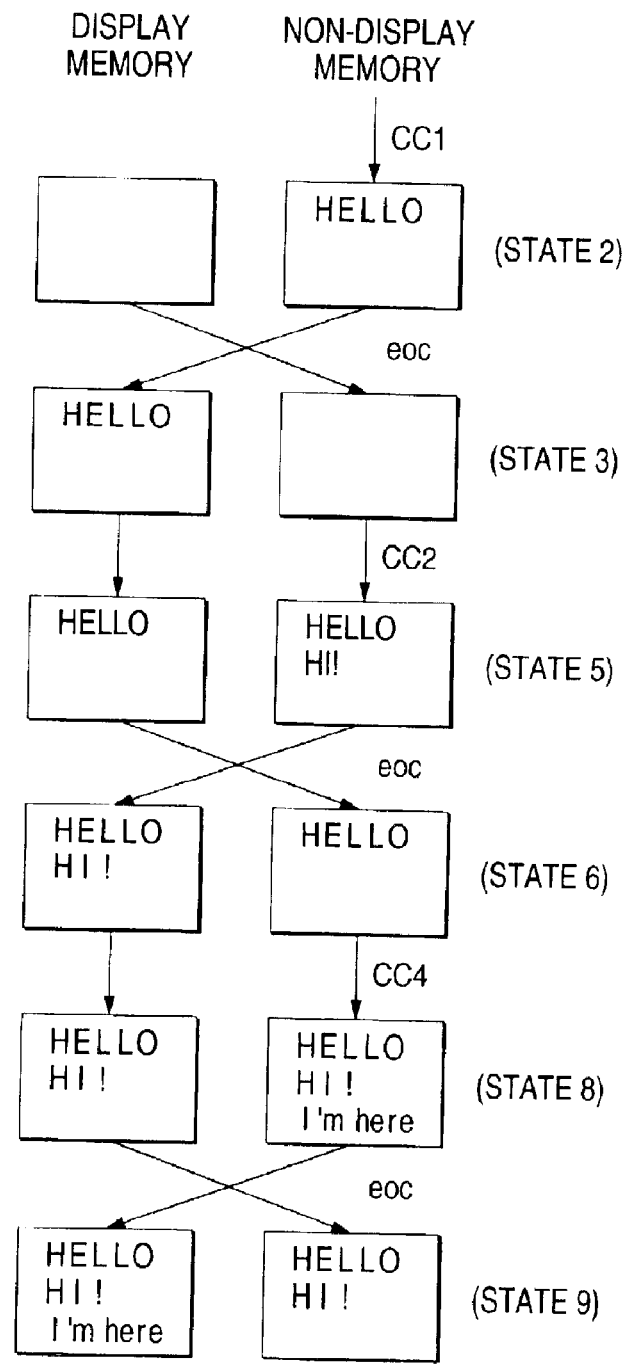

For instance, though in the above embodiment, CC3 is the closed caption data of the Line 21 method consisting of "HELLO" in the first line, "HI!" in the second line and "I'm here" in the third line, "HELLO" in the first line is stored in the non-display memory, whereby "HI!" in the second line and "I'm here" in the third line converted into the closed caption data (CC4) of the Line 21 method may be inserted into the analog picture signal (see FIGS. 7A and 7B). This CC4 has no reset code appended. Accordingly, the display unit 12 stores "HI!" in the second line and "I'm here" in the third line that are obtained by decoding the CC4 in the non-display memory, without deleting "HELLO" stored in the non-display memory.

For the contrast with the above embodiment, the states as shown in FIGS. 4 and 5 are shown in FIG. 7.

As will be apparent from FIG. 7, the display unit 12 does not reset the non-display memory, whereby the time taken to make the state transition is shortened. Accordingly, the time till the characters are displayed on the screen 12a can be shortened, thereby suppressing a temporal deviation between the picture and the characters displayed on the screen 12a. Thereby, the user has no sense of incompatibility.

Further, the before-last time converted character string storage area 22 is provided, whereby the data amount of closed caption data of the Line 21 method (data amount inserted into the analog picture signal) can be reduced. Accordingly, there is less load on the display unit itself, so that the operation of the display unit itself can be stabilized. Also, the time taken to distribute the closed caption data of the Line 21 method to the display unit 12 can be shortened, thereby further suppressing a temporal deviation between the picture and the characters displayed on the screen 12a.

By the way, some display units 12 clear the display-memory and the non-display memory if there is continued a fixed time A for which the closed caption data of the Line 21 method is not extracted from the input analog picture signal.

If the display unit 12 clears the display memory and the non-display memory without regard to the closed caption data of the Line 21 method distributed from the receiver 1, the storage contents of the last time converted character string storage area 21 and the before-last time converted character string storage area 22 provided in the storage section 3 of the receiver 1, and the storage contents of the display memory and the non-display memory provided in the display unit 12 itself are different in some cases, thereby causing the characters to be displayed improperly on the screen 12a by the method of FIG. 7.

Thus, the receiver 1 of this embodiment inserts the code having no effect on the screen 12a of the display unit 12, for example, a hop-on start code (code indicating the hop-on tile for the display unit 12), if there is continued a shorter time B for which the closed caption signal of the Line 21 method is inserted into the analog picture signal in the DVE 6 than the fixed time A, into the 21st scanning line of the analog picture signal.

Figure 8:
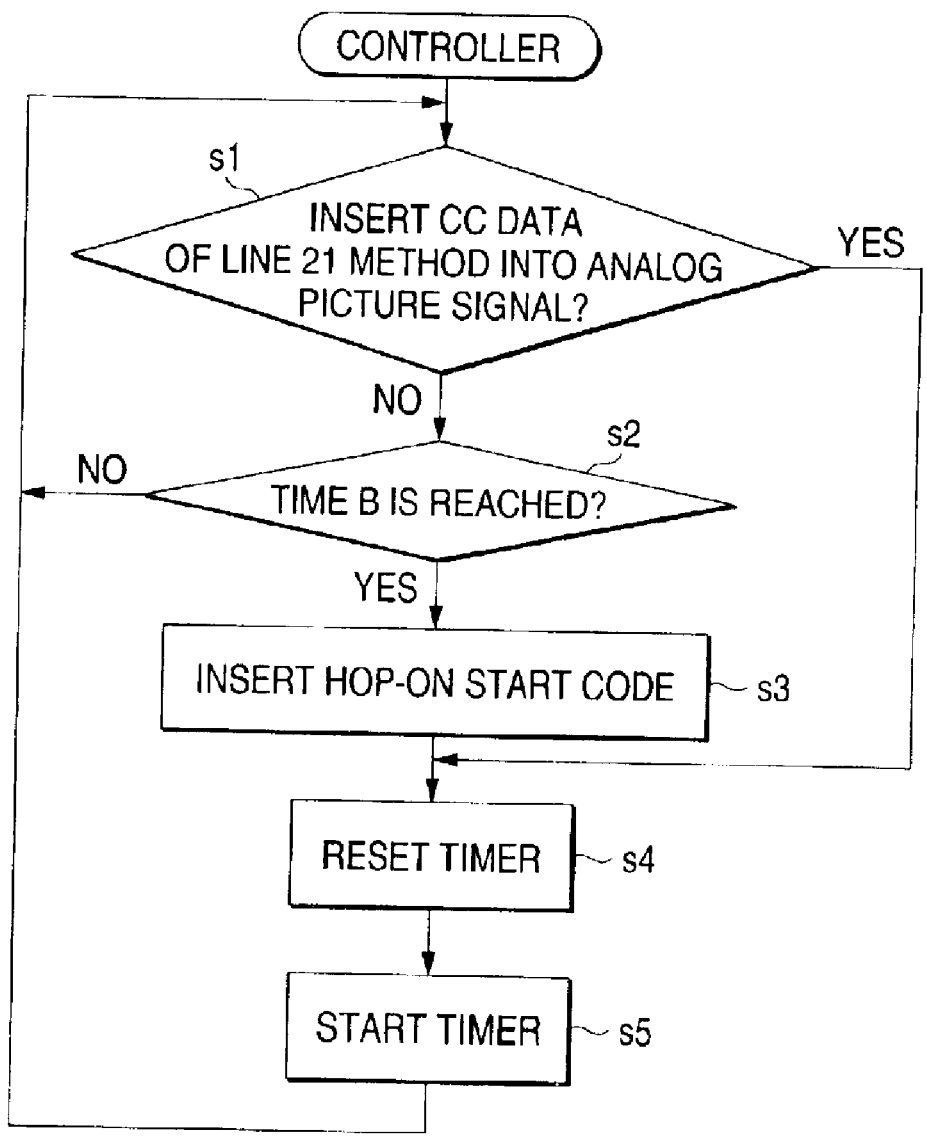
FIG. 8 is a flowchart showing the operation of the receiver according to the embodiment of the invention.

More specifically, the receiver 1 makes the processing as shown in FIG. 8. The controller 2 determines whether or not the closed caption data is inserted into the analog picture signal in the DVE 6 (s1). If the closed caption data is not inserted into the analog picture signal, it is determined whether or not the measurement time of a timer (not shown) reaches the time B (s2).

This timer measures the elapsed time since the closed caption signal of the Line 21 method is lastly inserted into the analog picture signal in the DVE 6.

Unless the time B is not reached, the procedure returns to step s1 to repeat the above determination.

On one hand, if the measurement time of the timer reaches the time B, the hop-on start code is inserted into the analog picture signal in the DVE 6 (s3). This hop-on start code is the code having no effect on the screen 12a of the display unit 12. The controller 2 resets the timer (s4), and starts the timer (s5).

If the closed caption data is inserted into the analog picture signal, the steps s4 and s5 are performed and the procedure returns to step s1.

Thereby, the display unit 12 decodes the hop-on start code inserted into the analog picture signal at step s3, before the fixed time A is elapsed. The display unit 12 has no time for which the closed caption data of the Line 21 method is not extracted continuing beyond the fixed time A. Accordingly, the display unit 12 does not clear the display memory and the non-display memory without regard to the closed caption data of the Line 21 method distributed from the receiver 1. Hence, the storage contents of the last time converted character string storage area 21 and the before-last time converted character string storage area 22 for the storage section 3 of the receiver 1, and the storage contents of the display memory and the non-display memory provided in the display unit 12 itself are coincident in any case, thereby enabling the characters to be displayed properly on the screen 12a of the display unit 12 by the method of FIG. 7.

Also, the receiver 1 of this embodiment has, in the controller 2, a caption task for analyzing the closed caption data distributed by the DTVCC method and converting it into the closed caption data of the Line 21 method, and a caption code output task for requesting the closed caption data of the Line 21 method converted for the caption task, and inserting the closed caption data of the Line 21 method obtained here into the analog picture signal.

Figure 9:
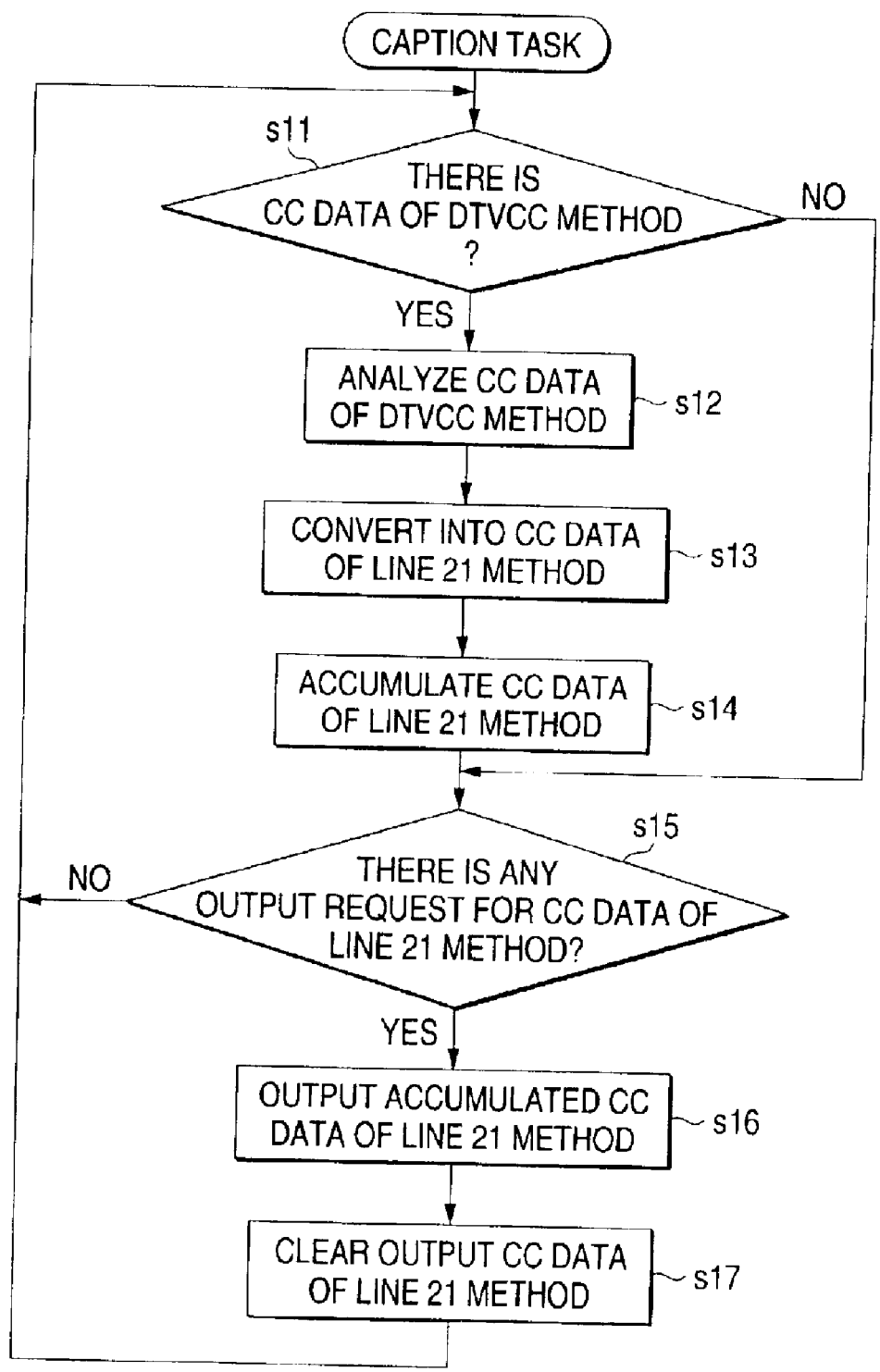
FIG. 9 is a flowchart showing the processing of a caption task in the receiver according to the embodiment of the invention.
Figure 10:
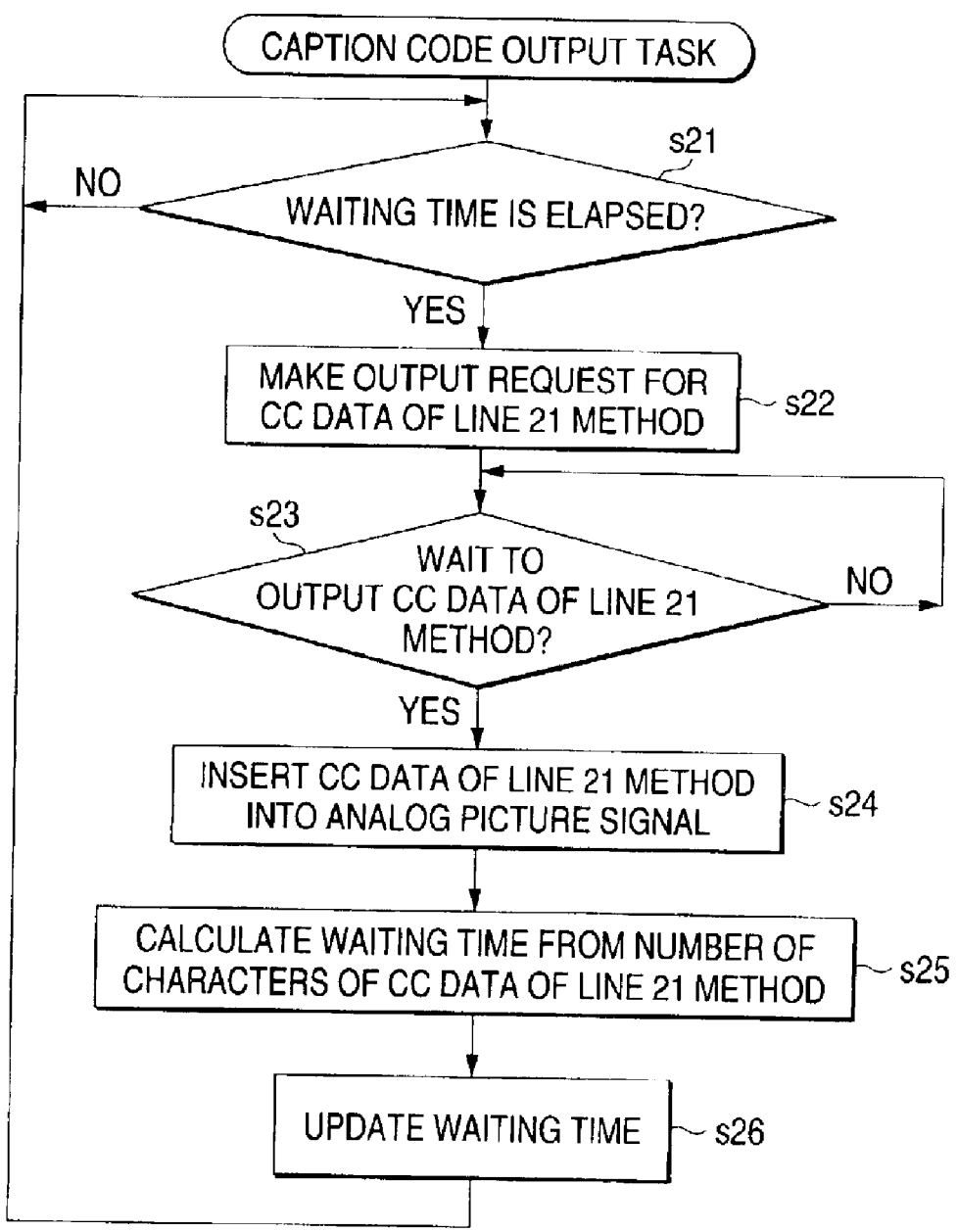
FIG. 10 is a flowchart showing the processing of a caption code output task in the receiver according to the embodiment of the invention.

FIG. 9 is a flowchart showing the processing of the caption task, and FIG. 10 is a flowchart showing the processing of the caption code output task.

Based on a caption task output code, it is determined whether or not there is the closed caption data of the DTVCC method extracted by the decoder 5 (s11). If it is determined that there is no closed caption data of the DTVCC method at step s11, the procedure jumps to step s15. If it is determined that there is any closed caption data of the DTVCC method at step s11, it is analyzed (s12), and converted into the closed caption data of the Line 21 method (s13). The closed caption data of the Line 21 method converted at step s13 is accumulated in the predetermined storage area (not shown) provided in the storage section 3 (s14).

At step s15, it is determined whether or not there is an output request for the closed caption data of the Line 21 method. This output request is entered from the caption code output task. If there is the output request for the closed caption data of the Line 21 method, the steps following s16 are performed, or if not, the procedure returns to step s11.

The caption code output task performs the steps following s22 after the elapse of a waiting time at step s21. This waiting time will be described later. If it is determined that the waiting time is elapsed at step s21, the caption task is requested to output the closed caption data of the Line 21 method (s22).

Returning to FIG. 9, if it is determined that there is an output request for the closed caption data of the Line 21 method at step s15, the closed caption data of the Line 21 method stored in the storage section 3 is output (s16). And the closed caption data of the Line 21 method stored in the storage section 3 (closed caption data output at step s16) is cleared (s17), and the procedure returns to step s11.

Returning to FIG. 10, the caption code output task waits for the closed caption data of the Line 21 method to be output from the caption task (s23). And the DVE 6 is controlled to insert the closed caption data of the Line 21 method output from the caption task into the analog picture signal (s24).

Then, the caption code output task calculates the waiting time, using a number of characters inserted into the analog picture signal and contained in the closed caption data of the Line 21 method (s25). The waiting time is calculated in accordance with the following expression.

Waiting time=$Tm+a\times$number of characters

Tm: Minimum display time
a: constant
Tm and a are appropriately set up.

The caption code output task renews the waiting time with the waiting time calculated at step s25 (s26), and the procedure returns to s21.

The waiting time calculated at step s25 is lengthened as the number of characters displayed on the screen 12a of the display unit 12 is increased. Also, the caption code output task makes an output request for the closed caption data, if the waiting time is elapsed.

The waiting time is the time till the display of characters on the screen 12a of the display unit 12 is updated. As described above, since the waiting time is longer with more characters displayed on the screen 12a of the display unit 12, the user can read the characters displayed on the screen surely, even if there are a great number of characters displayed on the screen 12a of the display unit 12, On the contrary, if there is a small number of characters displayed on the screen 12a of the display unit 12, the waiting time is elapsed rapidly, and the display of characters on the screen 12a of the display unit 12 is updated, thereby suppressing a temporal deviation between the picture displayed on the screen 12a and the characters.

Also, the caption code output task may perform the processing of FIG. 8, in addition to the main processing.

Next, another embodiment of this invention will be described below. The receiver 1 of this embodiment is configured as shown in FIG. 1. The display format can be changed in accordance with the number of windows for displaying the characters.

More specifically, when there is provided a single window, the roll-up style is decided as the display format of characters on the display unit 12, or when there are provided a plurality of windows, the hop-on style is decided.

Figure 11:
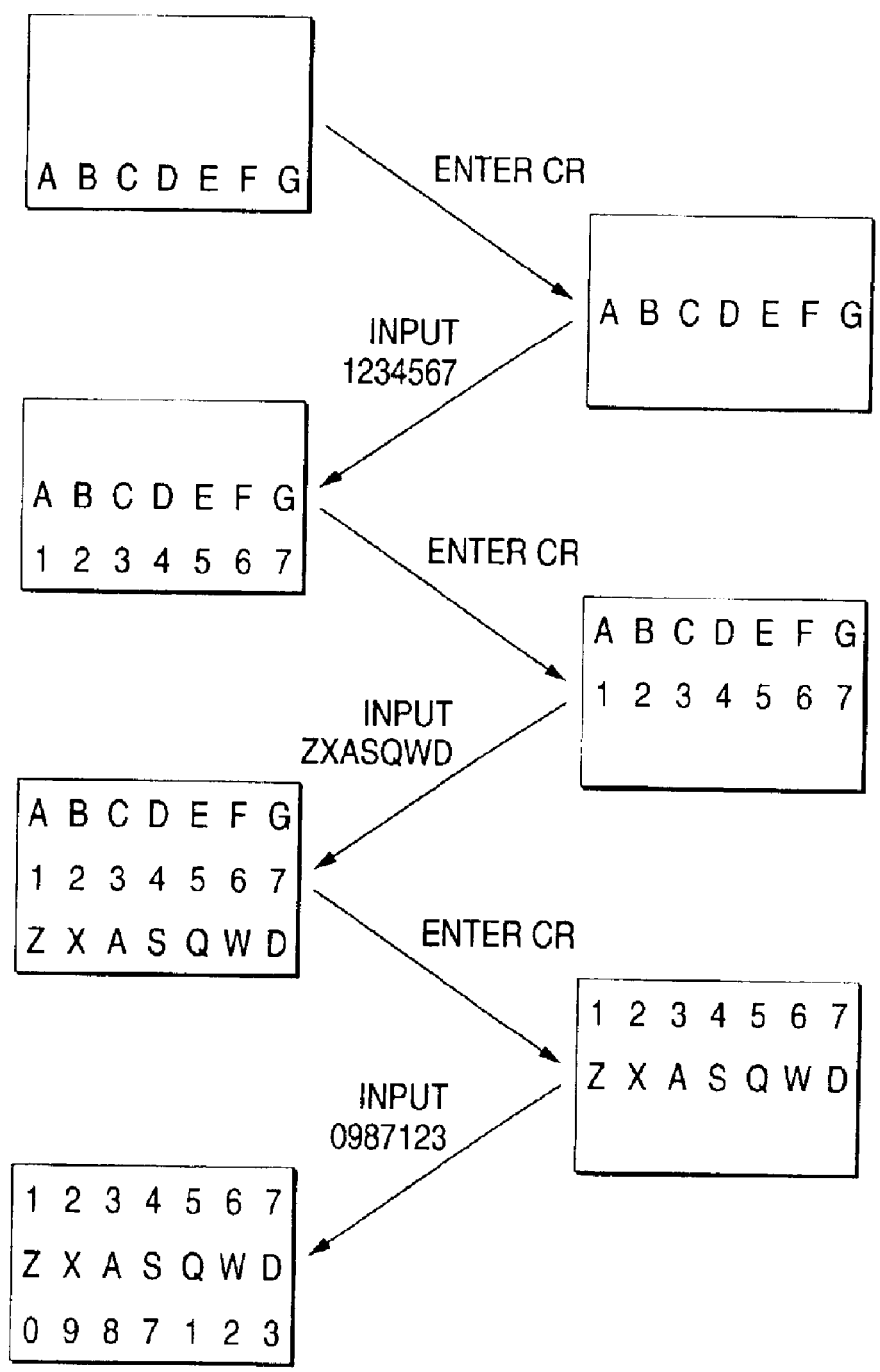
FIG. 11 is a diagram showing a display example on the screen of a display unit connected to the receiver according to the embodiment of the invention.

The roll-up style is the display format in which the characters are written at the lowest line, and if the character is written at the right end, the carriage return code is entered to move each line of characters written upward one line, thereby effecting the scroll display on the screen 12a, as shown in FIG. 11. The characters written at the uppermost line are cleared at this time.

Figure 12:
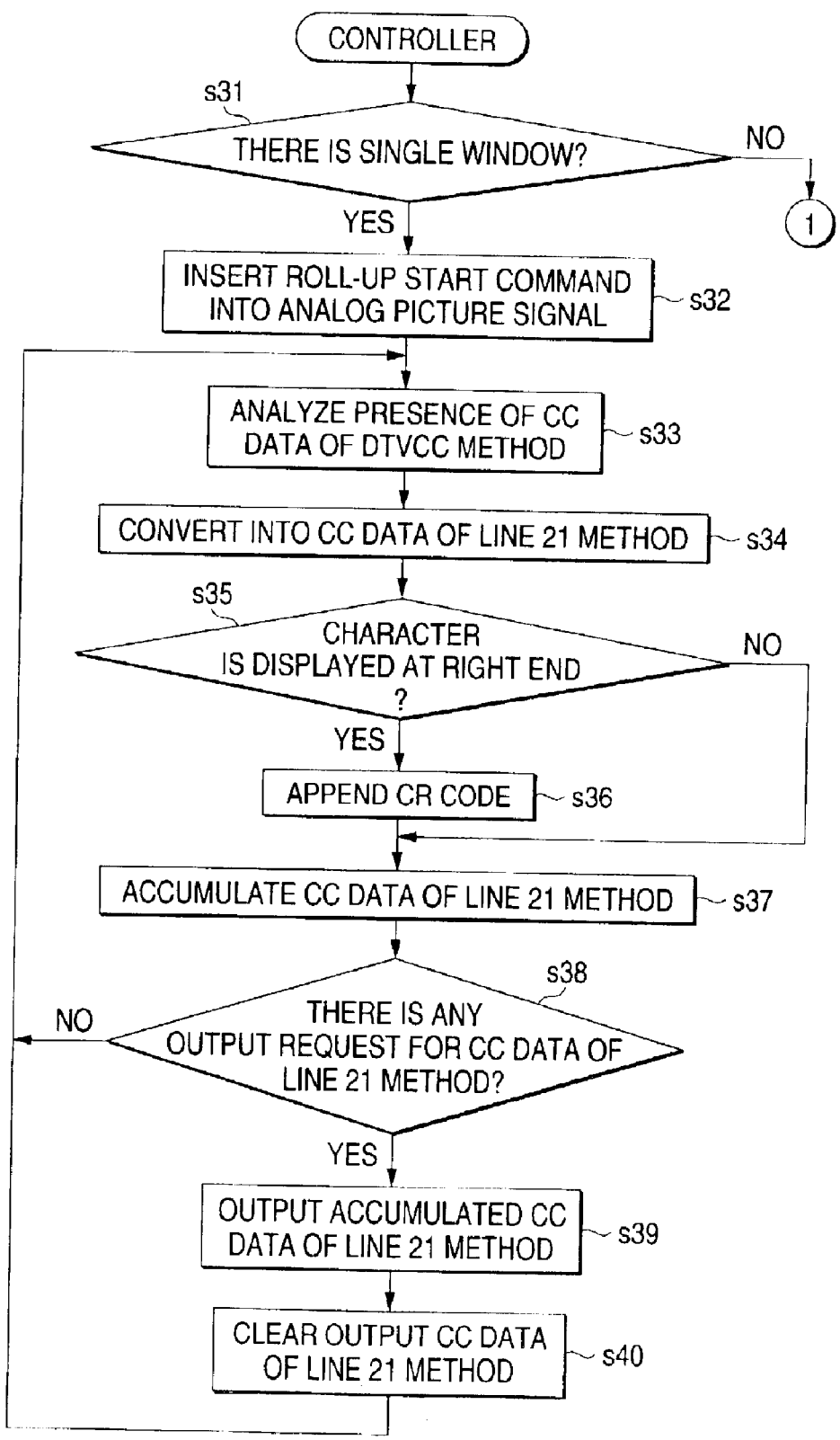
FIG. 12 is a flowchart showing the operation of the receiver according to the embodiment of the invention.
Figure 13:
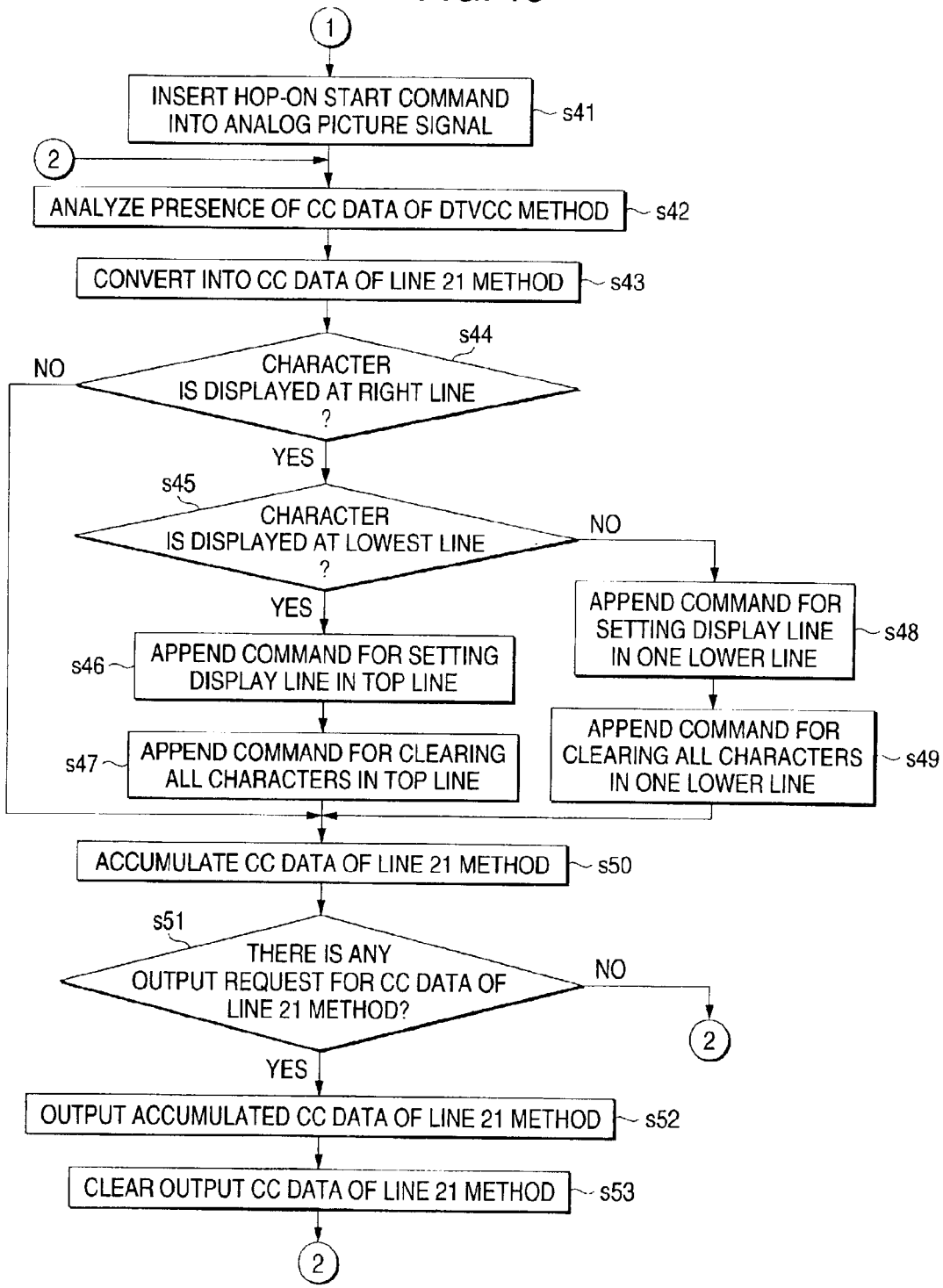
FIG. 13 is a flowchart showing the operation of the receiver according to the embodiment of the invention.

FIGS. 12 and 13 are flowcharts showing the operation of the receiver according to this invention. The controller 2 analyzes the closed caption signal of the DTVCC method extracted by the decoder 5, and determines whether or not there is a single window or a plurality of windows for displaying the characters (s31). Herein, if it is determined that there is single window, the roll-up start command for the closed caption data of the Line 21 method (the closed caption data of the Line 21 method) is inserted into the analog picture signal (s32). This roll-up start command is distributed to the display unit 12.

The display unit 12 decides the roll-up style as the display format, when decoding this roll-up start command.

Next, the controller 2 analyzes the closed caption data of the DTVCC method extracted by the decoder 5 (s33), and converts it into the closed caption data of the Line 21 method in the roll-up style (s34). The controller 2 determines whether or not each of the characters converted into the closed caption data of the Line 21 method is displayed at the right end on the screen 12a of the display unit 12 (s35). If it is determined that the character is displayed at the right end, the CR code (Carriage Return code) is appended after its character (s36).

The receiver 1 accumulates the closed caption data of the Line 21 method in the roll-up style that is obtained at steps s33 to s36 in the storage section 3 (s37). At step s38, it is determined whether or not there is an output request for the closed caption data of the Line 21 method. If there is any output request, the closed caption data of the Line 21 method stored in the storage section 3 is output (s39). And the closed caption data of the Line 21 method in the roll-up style that is stored in the storage section 3 (or the output closed caption data) is cleared (s40), and the procedure returns to s33.

The roll-up style is the display format in which each line of characters is moved up one line when the display unit 12 accepts the CR code, thereby scrolling the characters upward, and suitable when the characters are displayed over multiple lines.

With the above processing, the scroll display in the roll-up style as shown in FIG. 11 is effected on the screen 12a of the display unit 12.

The receiver 1 may transmit the characters displayed at the lowest line as the closed caption data of the Line 21 method, whereby there is less data amount of closed caption data of the Line 21 method than in other display formats.

The instance where there are provided a plurality of windows for displaying the characters will be described below. The hop-on start command of the closed caption data of the Line 21 method (or the closed caption data of the Line 21 method) is inserted into the analog picture signal (s41) (see FIG. 13).

This hop-on start command is distributed to the display unit 12. The display unit 12 decides the hop-on style as the display format, when decoding the hop-on start command.

The controller 2 analyzes the closed caption data of the DTVCC method extracted by the decoder 5 (s42), and converts it into the closed caption data of the Line 21 method in the hop-on style (s43). The controller 2 determines whether or not each of the characters converted into the closed caption data of the Line 21 method is displayed at the right end on the screen 12a of the display unit 12 (s44). If it is determined that the character is displayed at the right end, the following processing is performed and a command is appended after its character.

First of all, it is determined whether or not the line for this character is at the lowest line (s45). If it is not at the lowest line, a command for setting up the display line of following characters in one lower line is appended (s48), and a command for clearing this line is appended (s49). On one hand, if it is at the lowest line, a command for setting up the display line of following characters in one top line is appended (s46), and a command for clearing this top line is appended (s47).

The controller 2 accumulates the closed caption data of the Line 21 method in the hop-up style that is obtained at steps s42 to s49 in the storage section 3 (s50). At step s51, it is determined whether or not there is an output request for the closed caption data of the Line 21 method. If there is any output request, the closed caption data of the Line 21 method in the hop-up style accumulated in the storage section 3 is output (s52). And the closed caption data accumulated in the storage section 3 (or the output closed caption data) is cleared (s53), and the procedure returns to s42.

Figure 14:
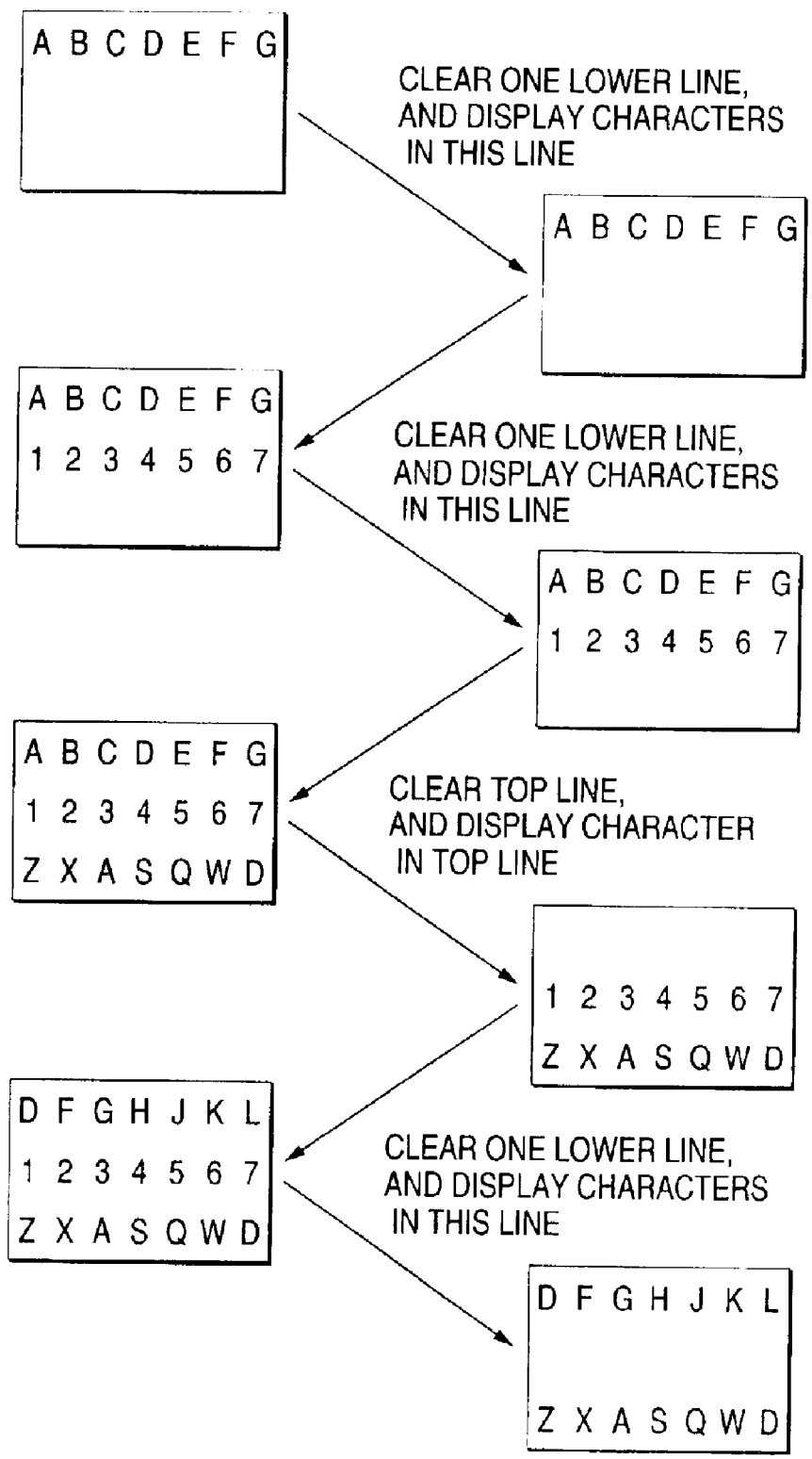
FIG. 14 is a diagram showing a display example on the screen of the display unit connected to the receiver according to the embodiment of the invention.

FIG. 14 is a diagram showing a display example on the screen of the display unit when the hop-on style is selected.

On the screen 12a, the characters are displayed from the top line in the window. If the top line is filled with the characters, the processing of clearing all the characters in one lower line is performed, and the following characters are displayed in this line. If this line is also filled with the characters, the processing of clearing all the characters in one lower line is performed, and the following characters are displayed in this line. And if the lowermost line is filled with the characters, all the characters displayed in the top line are cleared, and the following characters are displayed in the top line. This process is repeated.

In this manner, the pseudo scroll display with the hop-on style is made on the screen 12a of the display unit 12.

In the roll-up style, when a plurality of windows are equipped, the scroll can not be made for each window. More specifically, in the roll-up style, if the display unit 12 decodes the CR, the scroll occurs through all the windows. Therefore, when there are provided a plurality of windows, the roll-up style should not be selected.

Moreover, the receiver 1 according to another embodiment of this invention will be described below. The receiver 1 of this embodiment is configured as shown in FIG. 1.

Figure 15:
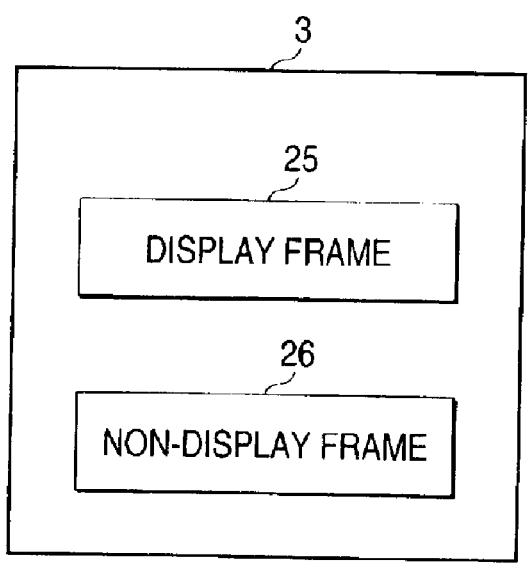
FIG. 15 is a diagram for explaining the functional configuration of the storage section of the receiver according to the embodiment of the invention.

The receiver 1 of this embodiment has a display frame 25 and a non-display frame 26 in the storage section 3, as shown in FIG. 15. The display frame 25 and the non-display frame 26 will be described below.

Figure 16:
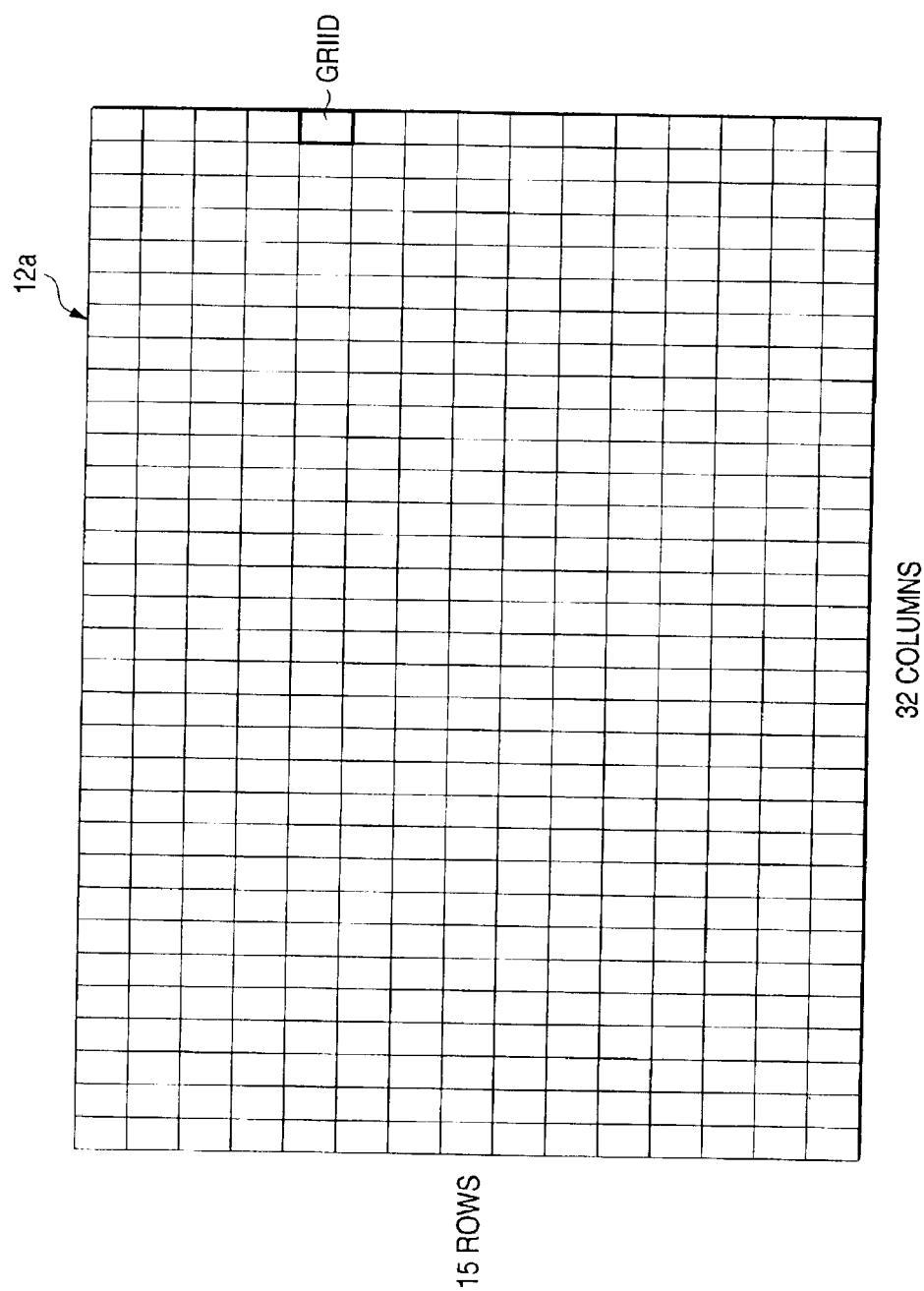
FIG. 16 is a diagram showing the screen of the display unit.

In the DTVCC method, up to eight windows for displaying the characters on the screen 12a of the display unit 12 can be set up. In the Line 21 method, one character is displayed in each of the grids in which the screen 12a of the display unit 12 is divided into 15 rows×32 columns, as shown in FIG. 16. In the display frame 25 and the non-display frame 26, there is a manager for managing the characters in which window are displayed in which grids on the screen 12a of the display unit 12.

In the DTVCC method, the ID, character string, coordinates, degree of priority, and the attribute indicating the display or non-display for each window are distributed. The ID is the number for identifying the window. The coordinates are the information indicating the position of window on the screen 12a. The degree of priority is the information for designating the priority of window in the part where one window overlaps other windows. The window with higher priority is disposed at upper level. The window disposed at lower level does not allow the characters in the overlapped part to be displayed. The attribute indicating the display or non-display is the information as to whether the character string in the window is displayed or not. The window of display attribute allows the characters to be displayed on the screen 12a, but the window of non-display attribute does not allow the characters to be displayed on the screen 12a.

The display frame 25 is a frame memory in which the results of determining the characters in which window are displayed in which grids on the screen 12a are registered for the window of display attribute by analyzing the closed caption data distributed in the DTVCC method.

On the other hand, the non-display frame 26 is a frame memory in which the results of determining the characters in which window are displayed in which grids on the screen 12a are registered for the window of non-display attribute by analyzing the closed caption data distributed in the DTVCC method.

An instance where the windows with ID=1 to 4 that have the display attribute in the DTVCC method and the windows with ID=5 to 8 that have the non-display attribute are distributed will be specifically described below. The receiver 1 analyzes the closed caption data distributed in the DTVCC method. Herein, it is supposed that the closed caption data distributed in the DTVCC method is displayed on the screen 12a of the display unit 12 as shown in FIG. 17.

Figure 17:
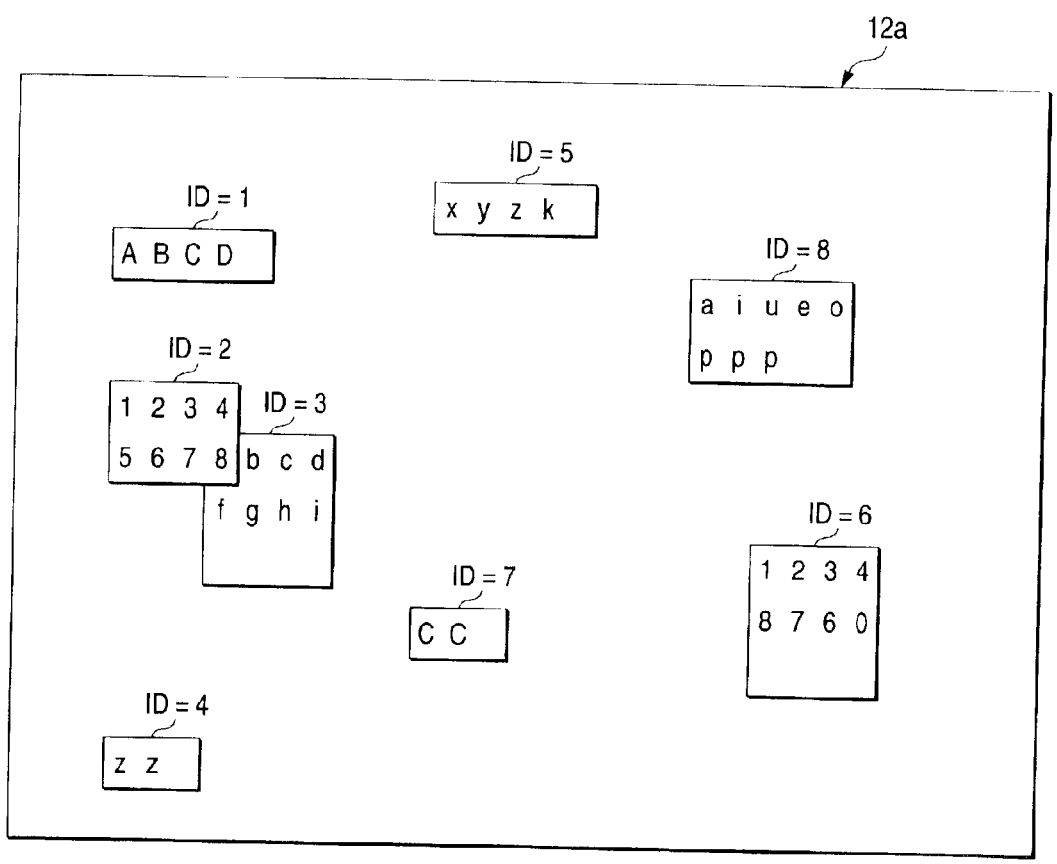
FIG. 17 is a diagram for explaining the caption data distributed in the DTVCC method.

In FIG. 17, the windows with ID=1 to 4 have the display attribute, and the windows with ID=5 to 8 have the non-display attribute.

Figure 18:
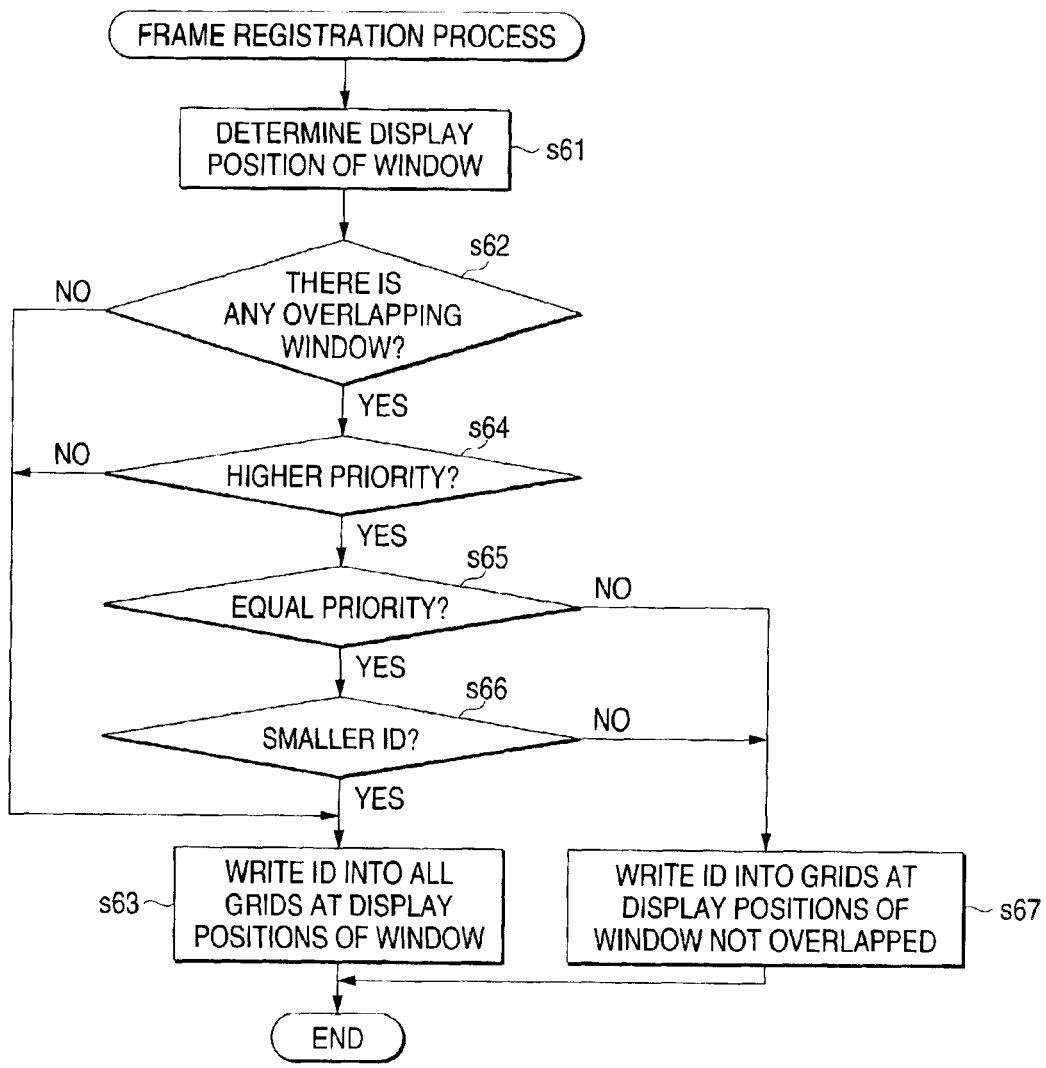
FIG. 18 is a flowchart showing a frame registration process of the receiver according to the embodiment of the invention.

The controller 2 performs a frame registration process of FIG. 18 for the display frame 25 in each of the windows with ID=1 to 4 that have the display attribute. The controller 2 determines the position on the screen 12a for the window with ID=1 (s61). The controller 2 determines whether or not any other window exists at the position determined at step s61 (s62). If no other window exists, the corresponding ID is written into the grid corresponding to the position determined at step s61 (s63).

If it is determined at step s62 that there is other window (overlapping window), the controller 2 determined whether or not the window has a higher priority than the overlapping window (s64). If it is determined that the window has higher priority at step s64, the corresponding ID is written into the grid corresponding to the position determined at step s61 (s63).

If the priority is equal (S65), it is determined whether or not the window has a smaller ID than the overlapping window (s66). If the window has the smaller ID, the corresponding ID is written into the grip corresponding to the position determined at step s61 (s63).

If the window has the lower priority or larger ID than the overlapping window, ID is written into the grid other than overlapping part (s67).

Figure 19:
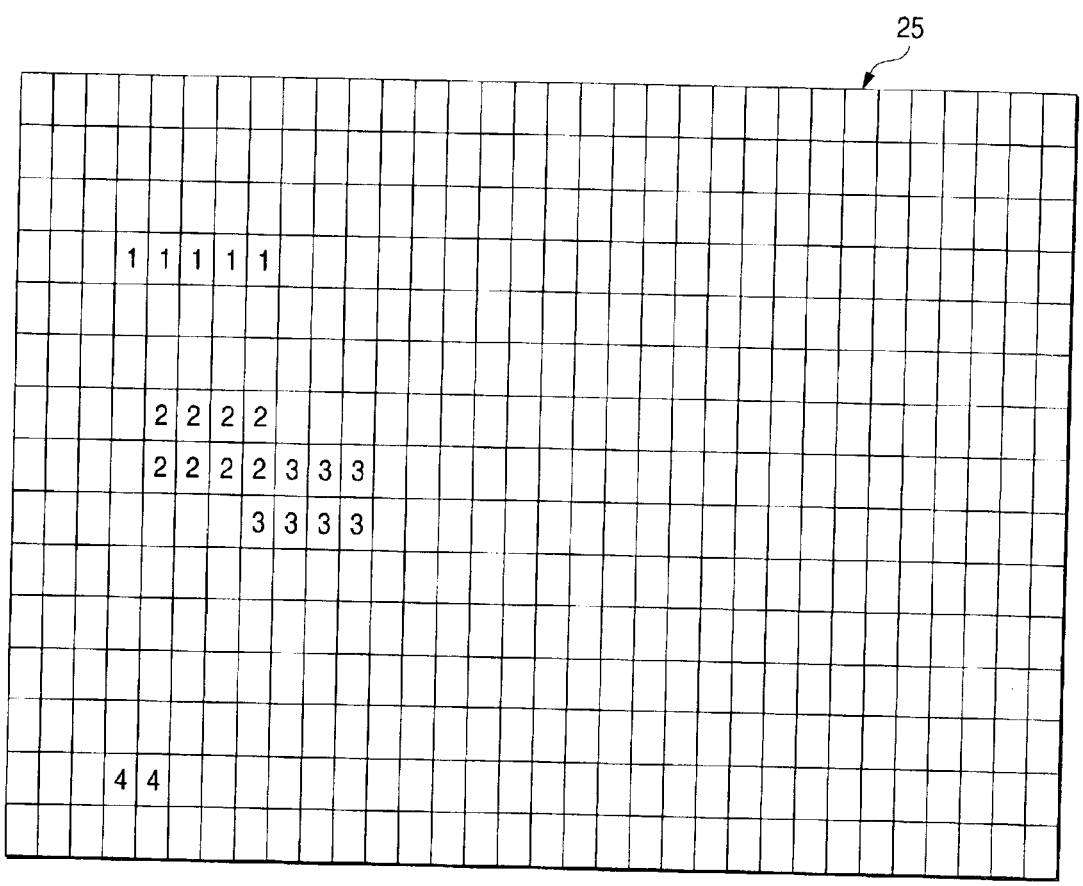
FIG. 19 is a diagram showing a display frame of the receiver according to the embodiment of the invention.

The controller 2 performs the above processings for the windows of display attribute (here, windows with ID=1 to 4) to acquire the display frame 25 as shown in FIG. 19.

Figure 20:
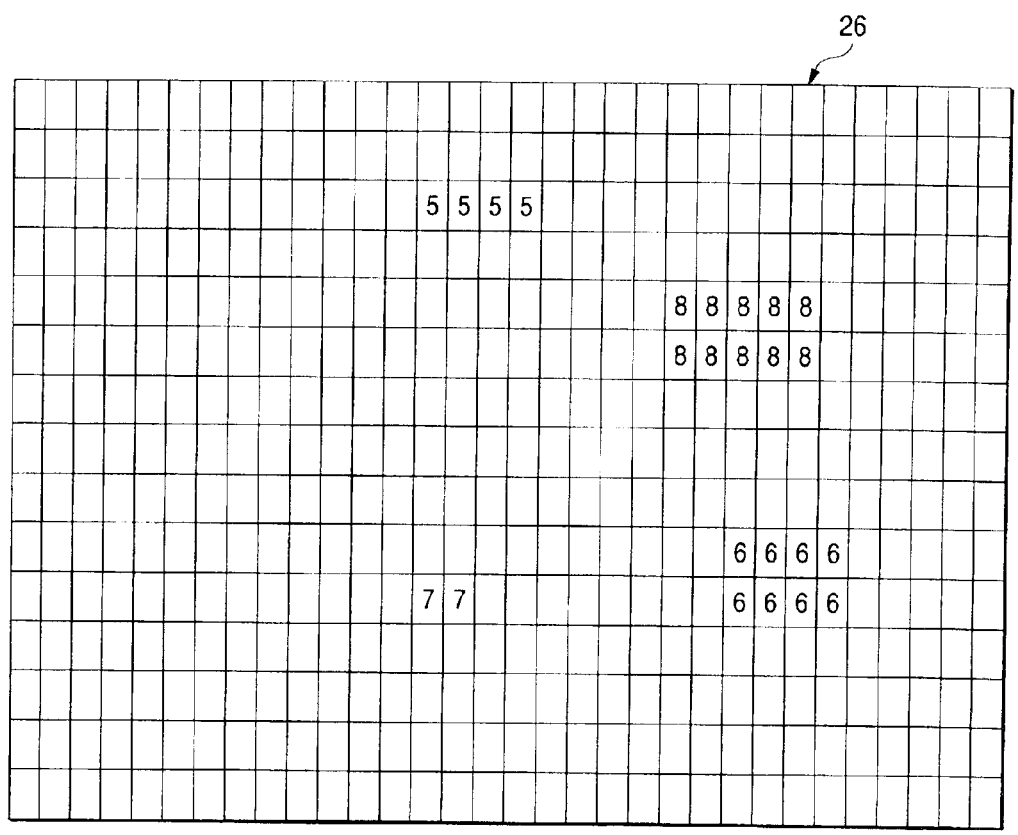
FIG. 20 is a diagram showing a non-display frame of the receiver according to the embodiment of the invention.

Also, the controller 2 performs the above frame processings for the windows of non-display attribute (here, windows with ID=5 to 8) to acquire the non-display frame 26 as shown in FIG. 20.

The display frame 25 stores the layout of the window of display attribute on the screen 12a, and the display frame 26 stores the layout of the window of non-display attribute on the screen 12a.

The receiver 1 of this embodiment converts the closed caption data of the DTVCC method into the closed caption data of the Line 21 method, employing the display frame 25 obtained through the above processings.

More specifically, the characters to be displayed on the screen 12a of the display unit 12 are decided, based on this display frame 25. As is well known, the Line 21 method allows a maximum of four lines to be displayed on the screen 12a. The controller 2 decides four lines to be displayed on the screen 12a from this display frame, and converts the decided four lines into the caption data of the Line 21 method. A method for deciding the four lines may use the priority or the magnitude of ID.

In this manner, the receiver 1 of this embodiment converts the received closed caption data of the DTVCC method into the closed caption data of the Line 21 method, employing the display frame 25, and therefore can determine quickly which character in window is converted from the closed caption data distributed in the DTVCC method in the conversion. Accordingly, the time taken to make conversion of the closed caption data of the Line 21 method is shortened.

In the display frame 25 and the non-display memory 26, instead of the ID number, the character to be displayed may be written into the grid, in which the storage capacity of the display frame 25 is increased unfavorably. Because the ID can be stored in three bits, but the character is stored in 2 bytes.

The DTVCC method includes a command for setting up a maximum of eight windows to the display attribute or non-display attribute, and a command for switching all the windows of display attribute into the non-display attribute or switching all the windows of non-display attribute into the display attribute. The receiver 1 of this embodiment has the non-display frame 26, and can renew the display frame 25 and the non-display frame 26 quickly for the command for switching the window between the display attribute and the non-display attribute. The reason is described below.

Figure 21:
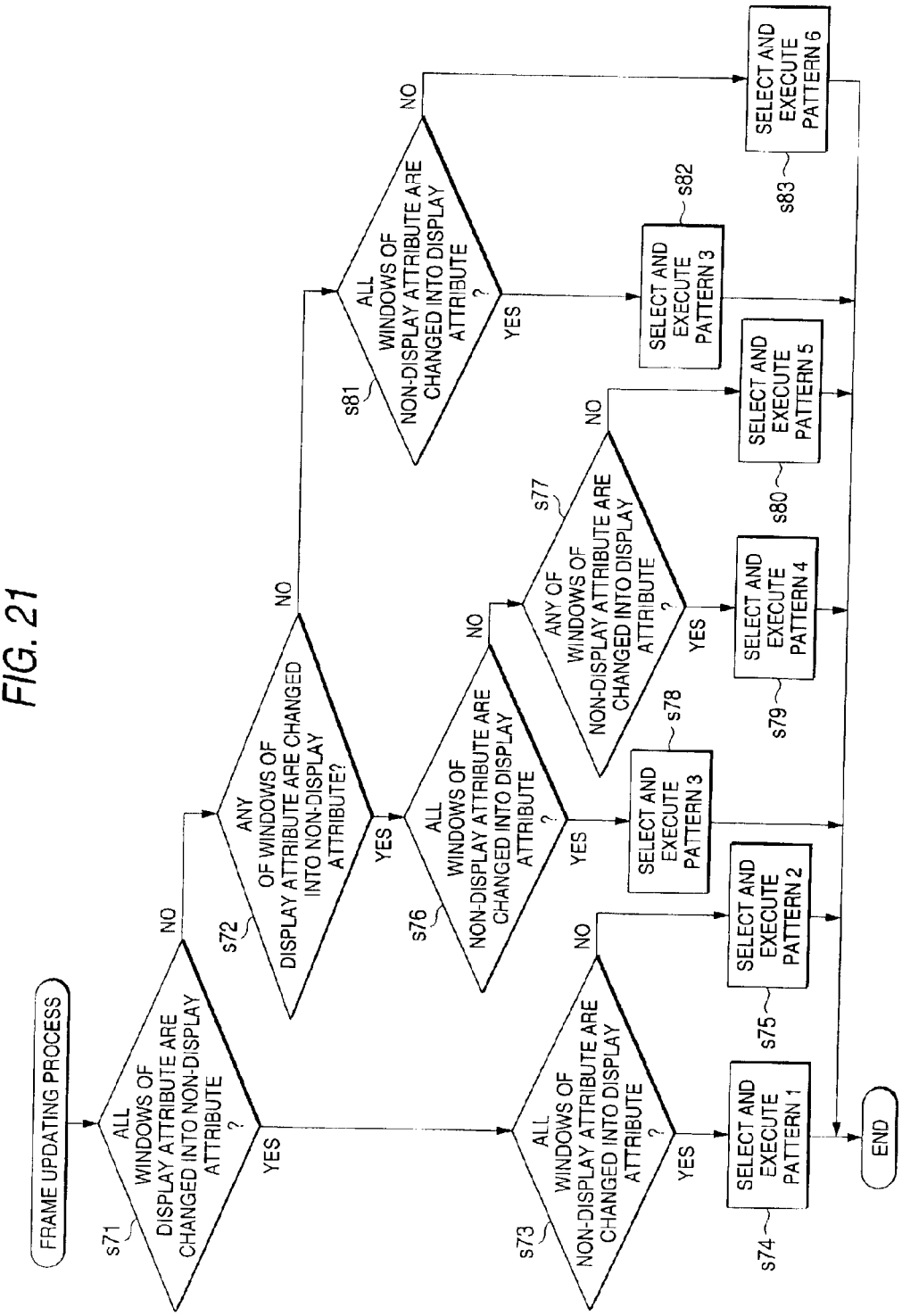
FIG. 21 is a flowchart showing a frame update process of the receiver according to the embodiment of the invention.

The receiver 1 decodes the command for switching the window between the display attribute and the non-display attribute, and then makes a frame update process as shown in FIG. 21. FIG. 21 is a flowchart showing the frame update process.

The controller 2 determines whether or not the command instructs the switching of all the windows of display attribute at present into the non-display attribute (s71). If the command does not instruct the switching of all the windows of display attribute at present into the non-display attribute, it is determined whether or not the command instructs the switching of some of the windows of display attribute at present into the non-display attribute (s72). Also, if the command instructs the switching of all the windows of display attribute at present into the non-display attribute, it is determined whether or not the command instructs the switching of all the windows of non-display attribute at present into the display attribute (s73).

Figure 22:
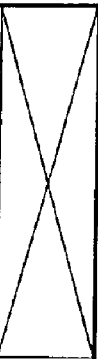
FIG. 22 is a diagram for explaining the frame update process of the receiver according to the embodiment of the invention.

If the command is determined to instruct the switching of all the windows of non-display attribute into the display attribute, the updating pattern 1 (hereinafter referred to as a pattern 1) for the display frame 25 and the non-display frame 26 is selected and executed (s74). On the other hand, if not, the pattern 2 is selected and executed (s75). There are six updating patterns for the display frame 25 and the non-display frame 26 (see FIG. 22).

The pattern 1 involves changing the display frame 25 into the non-display frame 26, and changing the non-display frame 26 into the display frame 25. The pattern 2 involves changing the display frame 25 into the non-display frame 26, changing the non-display frame 26 into the display frame 25, clearing the changed display frame 25, and registering each window registered in the display frame 25 cleared here in the display frame 25 or the non-display frame 26 in accordance with the attribute (display/non-display attribute) instructed at present. This processing for registering the display frame 25 or the non-display frame 26 is the frame registration process as shown in FIG. 18.

Also, if the controller 2 determines at step s72 that some of the windows are changed, it is determined whether or not the command instructs the switching of all the windows of non-display attribute at present into the display attribute (s76). If the command does not instruct the switching of all the windows of non-display attribute at present into the display attribute, it is determined whether or not the command instructs the switching of some of the windows of non-display attribute at present into the display attribute (s77). If the command is determined to instruct the switching of all the windows of non-display attribute at present into the display attribute, the pattern 3 is selected and executed (s78). If the command is determined to instruct the switching of some of the windows of non-display attribute at present into the display attribute, the pattern 4 is selected and executed (s79). If the command is not determined to instruct the switching of some of the windows of non-display attribute at present into the display attribute at step s77, the pattern 5 is selected and executed (s80).

The pattern 3 involves changing the display frame 25 into the non-display frame 26, changing the non-display frame 26 into the display frame 25, clearing the changed non-display frame 26, and registering each window registered in the non-display frame 26 cleared here in the display frame 25 or the non-display frame 26 in accordance with the attribute (display/non-display attribute) instructed at present.

The pattern 4 involves clearing the display frame 25 and the non-display frame 26, and registering each of all the windows in the display frame 25 or the non-display frame 26 in accordance with the attribute (display/non-display attribute) instructed at present.

The pattern 5 involves clearing the display frame 25, and registering each window registered in the display frame 25 cleared here in the display frame 25 or the non-display frame 26 in accordance with the attribute (display/non-display attribute) instructed at present.

Further, if the controller 2 determines that the command does not instruct the switching of some of the windows of display attribute at present into the non-display attribute at step s72, it is determined whether or not the command instructs the switching of all the windows of non-display attribute at present into the display attribute (s81). At step s81, if the command is determined to instruct the switching of all the windows of non-display attribute at present into the display attribute, the pattern 3 is selected and executed (s82). If the command is determined to instruct the switching of all the windows of non-display attribute at present into the display attribute at step s81, the pattern 6 is selected and executed (s83).

The pattern 6 involves clearing the display frame 26, and registering each window registered in the non-display frame 26 cleared herein the display frame 25 or the non-display frame 26 in accordance with the attribute (display/non-display attribute) instructed at present.

In this manner, since the non-display frame 26 is equipped, the display frame 25 and the non-display frame 26 are changed by the command for instructing the switching of the window between the display attribute and the non-display attribute, whereby it is possible to suppress the number of windows to be registered (windows making the frame registration process of FIG. 18) for the display frame 25 and the non-display frame 26. Thereby, the display frame 25 and the non-display frame 26 can be renewed quickly for the command for instructing the switching of the window between the display attribute and the non-display attribute.

As described above, with this invention, the caption data distributed by the digital broadcasting signal is analyzed, and converted into the caption data of the analog broadcasting method for output. Accordingly, one can watch and listen to the caption broadcast program distributed by the digital broadcasting signal on the display unit for the television receiver that can handle the analog broadcasting.

Since the data amount of caption data of the analog method to be output is suppressed, the time taken to input the caption data into the display unit can be shortened, thereby suppressing a temporal deviation between the picture and the characters displayed on the screen. Consequently, the user has no sense of incompatibility.

Moreover, the caption data distributed by the digital method is quickly converted into the caption data of the analog method for output, thereby suppressing a temporal deviation between the picture and the characters displayed on the screen. Consequently, the user has no sense of incompatibility.

What is claimed is:

1. A television receiver comprising:

receiving means for receiving a digital broadcasting signal;

extracting means for extracting the picture data and the caption data from the digital broadcasting signal received by said receiving means;

picture signal converting means for converting the picture data extracted by said extracting means into an analog picture signal;

caption data converting means for converting the caption data extracted by said extracting means into the caption data of the analog broadcasting system;

caption data inserting means for inserting the caption data of the analog broadcasting system converted by said caption data converting means into said analog picture signal converted by said picture signal converting means;

analog picture signal output means for outputting an analog picture signal having the caption data of the analog broadcasting system inserted by said caption data inserting means;

storage contents holding means for holding the storage contents of a display memory and a non-display memory for a display unit;

code inserting means for measuring the time elapsed since the previous time of inserting the caption data of the analog broadcasting system into said analog picture signal by said caption data inserting means, and inserting a predetermined code into the analog picture signal when said time elapsed reaches a preset time; and adjusting means for adjusting the waiting time up to inserting the caption data of the analog broadcasting system into the analog picture signal at the next time in accordance with the number of characters of the caption data of the analog broadcasting system inserted into said analog picture signal by said caption data inserting means;

wherein said caption data converting means converts the caption data into the hop-on style in which the characters decoded from the input caption data in the display unit are stored successively in the non-display memory, and when a predetermined code is obtained by decoding the input caption data, said non-display memory is switched into the display memory, and conversely the display memory is switched into the non-display memory.

2. A television receiver comprising:

receiving means for receiving a digital broadcasting signal;

extracting means for extracting the picture data and the caption data from the digital broadcasting signal received by said receiving means;

picture signal converting means for converting the picture data extracted by said extracting means into an analog picture signal;

caption data converting means for converting the caption data extracted by said extracting means into the caption data of the analog broadcasting system;

caption data inserting means for inserting the caption data of the analog broadcasting system converted by said caption data converting means into said analog picture signal converted by said picture signal converting means;

analog picture signal output means for outputting an analog picture signal having the caption data of the analog broadcasting system inserted by said caption data inserting means; and determination means for determining whether or not there is provided a single display window of characters based on the caption data of the analog broadcasting system;

wherein said caption data converting means instructs a display unit to write the character data based on the caption data into a non-display memory of said display unit and converts the caption data into the hop-on style to instruct to switch the function between the display memory storing the character data that said display unit displays at present and the non-display memory, if said determination means determines that a plurality of display windows are provided, or converts the caption data into the roll-up style to display the characters while being scrolled, if said determination means determines that there is provided a single display window.

3. A television receiver comprising:

receiving means for receiving a digital broadcasting signal;

extracting means for extracting the picture data and the caption data from the digital broadcasting signal received by said receiving means;

picture signal converting means for converting the picture data extracted by said extracting means into an analog picture signal;

caption data converting means for converting the caption data extracted by said extracting means into the caption data of the analog broadcasting system;

caption data inserting means for inserting the caption data of the analog broadcasting system converted by said caption data converting means into said analog picture signal converted by said picture signal converting means; and analog picture signal output means for outputting an analog picture signal having the caption data of the analog broadcasting system inserted by said caption data inserting means, wherein the screen layouts are created for a window of display attribute for displaying the characters and a window of non-display attribute for displaying the characters under constraints even if there are characters to be displayed, based on the caption data extracted from said digital signal.

4. A television receiver comprising:

receiving means for receiving a digital broadcasting signal;

extracting means for extracting the picture data and the caption data from the digital broadcasting signal received by said receiving means;

picture signal converting means for converting the picture data extracted by said extracting means into an analog picture signal;

caption data converting means for converting the caption data extracted by said extracting means into the caption data of the analog broadcasting system;

caption data inserting means for inserting the caption data of the analog broadcasting system converted by said caption data converting means into said analog picture signal converted by said picture signal converting means; and analog picture signal output means for outputting an analog picture signal having the caption data of the analog broadcasting system inserted by said caption data inserting means, wherein said caption data converting means converts the caption data into the hop-on style in which the characters decoded from the input caption data in the display unit are stored successively in the non-display memory, and when a predetermined code is obtained by decoding the input caption data, said non-display memory is switched into the display memory, and conversely the display memory is switched into the non-display memory.

5. The television receiver according to claim 4, further comprising storage content holding means for holding the storage contents of the display memory and the non-display memory in said display unit.

6. The television receiver according to claim 5, further comprising code inserting means for measuring the time elapsed since the previous time of inserting the caption data of the analog broadcasting system in to said analog picture signal by said caption data inserting means, and inserting a predetermined code into the analog picture signal when said time elapsed reaches a preset time.

7. The television receiver according to claim 4, further comprising adjusting means for adjusting the waiting time up to inserting the caption data of the analog broadcasting system into the analog picture signal at the next time in accordance with the number of characters in the caption data of the analog broadcasting system inserted into said analog picture signal by said caption data inserting means.

8. A television receiver comprising:

receiving means for receiving a digital broadcasting signal;

extracting means for extracting the picture data and the caption data from the digital broadcasting signal received by said receiving means;

picture signal converting means for converting the picture data extracted by said extracting means into an analog picture signal;

caption data converting means for converting the caption data extracted by said extracting means into the caption data of the analog broadcasting system;

caption data inserting means for inserting the caption data of the analog broadcasting system converted by said caption data converting means into said analog picture signal converted by said picture signal converting means;

analog picture signal output means for outputting an analog picture signal having the caption data of the analog broadcasting system inserted by said caption data inserting means; and determination means for determining whether or not there is provided a single display window of characters based on the caption data of the analog broadcasting system;

wherein said caption data converting means decides a style of the caption data of the analog broadcasting system to be converted in accordance with the determined result of said determination means.

9. The television receiver according to claim 8, wherein said caption data converting means instructs the display unit to write the character data based on the caption data into the non-display memory of said display unit and converts the caption data into the hop-on style to instruct to switch the function between the display memory storing the character data that said display unit displays at present and the non-display memory, if said determination means determines that there are provided a plurality of display windows.

10. The television receiver according to claim 8, wherein said caption data converting means converts the caption data into the roll-up style to display the characters while being scrolled, if said determination means determines that there is provided a single display window.

11. A television receiver comprising:

receiving means for receiving a digital broadcasting signal;

extracting means for extracting the picture data and the caption data from the digital broadcasting signal received by said receiving means;

picture signal converting means for converting the picture data extracted by said extracting means into an analog picture signal;

caption data converting means for converting the caption data extracted by said extracting means into the caption data of the analog broadcasting system;

caption data inserting means for inserting the caption data of the analog broadcasting system converted by said caption data converting means into said analog picture signal converted by said picture signal converting means;

analog picture signal output means for outputting an analog picture signal having the caption data of the analog broadcasting system inserted by said caption data inserting means; and screen layout creating means for creating a screen layout for a window of display attribute for displaying the characters, based on the caption data extracted from said digital signal.

12. The television receiver according to claim 11, wherein said screen layout creating means creates a screen layout for a window of non-display attribute for displaying the characters under constraints even if there are characters to be displayed.

13. The television receiver according to any one of claims 4 to 12, wherein said caption data inserting means inserts the caption data of the analog system into the twenty first scanning line of the analog picture signal.

* * * * *